(12) United States Patent
Takeyoshi et al.

(10) Patent No.: US 8,203,958 B2
(45) Date of Patent: Jun. 19, 2012

(54) FRAME COUNTER CORRECTION APPARATUS, OPPOSING APPARATUS, AND FRAME COUNTER CORRECTION METHOD

(75) Inventors: Haruyuki Takeyoshi, Kawasaki (JP); Tatsuya Kawasumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/362,673

(22) Filed: Jan. 30, 2009

(65) Prior Publication Data

US 2009/0196188 A1 Aug. 6, 2009

(30) Foreign Application Priority Data

Feb. 1, 2008 (JP) ................................. 2008-022465

(51) Int. Cl.
*G01R 31/08* (2006.01)
(52) U.S. Cl. ....................................................... 370/242
(58) Field of Classification Search .................. 370/331, 370/466, 203, 229–240, 241–253, 254–258, 370/298–306, 351–356, 357–395, 395.1, 370/395.2, 395.21, 395.3, 395.31, 395.32, 370/395.4, 395.41, 395.42, 395.43, 395.5, 370/395.52, 395.53, 395.54, 395.6, 395.61, 370/396–411, 420–429, 503–520
See application file for complete search history.

(56) References Cited

U.S. PATENT DOCUMENTS

| | | | | |
|---|---|---|---|---|
| 5,943,328 A | * | 8/1999 | Hosford | 370/331 |
| 6,785,241 B1 | * | 8/2004 | Lu et al. | 370/241 |
| 2004/0105391 A1 | * | 6/2004 | Charcranoon | 370/252 |
| 2006/0239204 A1 | * | 10/2006 | Bordonaro et al. | 370/253 |
| 2007/0242620 A1 | * | 10/2007 | Zhai | 370/252 |
| 2007/0253357 A1 | * | 11/2007 | Das et al. | 370/328 |
| 2008/0080390 A1 | * | 4/2008 | Ebuchi et al. | 370/253 |
| 2008/0089327 A1 | * | 4/2008 | Lu et al. | 370/389 |
| 2008/0320262 A1 | * | 12/2008 | McKenney et al. | 711/163 |
| 2010/0008250 A1 | * | 1/2010 | Nomura et al. | 370/252 |
| 2010/0039935 A1 | * | 2/2010 | Davison et al. | 370/228 |

FOREIGN PATENT DOCUMENTS

JP 2006-197399 7/2006

OTHER PUBLICATIONS

ITU-T Y.1731 "OAM Functions and Mechanisms for Ethernet based networks" May 2006.

* cited by examiner

*Primary Examiner* — Kwang B Yao
*Assistant Examiner* — Jung-Jen Liu
(74) *Attorney, Agent, or Firm* — Katten Muchin Rosenman LLP

(57) ABSTRACT

A frame counter correction apparatus connected to an Ethernet network, including transmission counter for counting a number of frames to be transmitted; inspection frame generator for generating an inspection frame for measuring a frame loss; and transmission counter correction unit for calculating a difference between a counter value of the transmission counter at a time of generation of the inspection frame and the counter value of the transmission counter at a time of transmission of the inspection frame, and adding a calculated difference value and information for specifying the inspection frame as a correction target to another inspection frame.

7 Claims, 23 Drawing Sheets

FIG. 19A

| SEQUENCE NUMBER | COUNTER VALUE IN INSPECTION FRAME |
|---|---|
| 1 | A1 |
| 2 | A2 |
| 3 | A3 |
| . | . |

FIG. 19B

| SEQUENCE NUMBER | COUNTER VALUE AT TIME OF TRANSMISSION OF INSPECTION FRAME | CORRECTION VALUE OF CORRECTION APPARATUS |
|---|---|---|
| 1 | B1 | $\alpha 1$ |
| 2 | B2 | $\alpha 2 (=0)$ |
| 3 | B3 | $\alpha 3$ |
| . | . | . |

FIG. 19C

| SEQUENCE NUMBER | CORRECTION VALUE OF CORRECTION APPARATUS |
|---|---|
| 1 | $\alpha 1$ |
| 3 | $\alpha 3$ |
| 6 | $\alpha 6$ |

| SEQUENCE NUMBER | COUNTER VALUE AT TIME OF TRANSMISSION OF INSPECTION FRAME | RECEPTION COUNTER VALUE OF OPPOSING APPARATUS |
|---|---|---|
| 1 | B1 | C1 |
| 2 | B2 | C2 |
| 3 | B3 | C3 |
| . | . | . |

| SEQUENCE NUMBER | RECEPTION COUNTER VALUE OF OPPOSING APPARATUS | TRANSMISSION COUNTER VALUE IN INSPECTION FRAME | CORRECTION VALUE OF CORRECTION APPARATUS |
|---|---|---|---|
| 1 | C1 | E1 | – |
| 2 | C2 | E2 | – |
| 3 | C3 | E3 | $\beta 3$ |
| . | . | . | . |

| SEQUENCE NUMBER | COUNTER VALUE AT TIME OF TRANSMISSION OF INSPECTION FRAME | RECEPTION COUNTER VALUE OF OPPOSING APPARATUS | RECEPTION COUNTER VALUE OF CORRECTION APPARATUS | COUNTER VALUE AFTER CORRECTION OF OPPOSING APPARATUS |
|---|---|---|---|---|
| 1 | B1 | C1 | F1 | E1 |
| 2 | B2 | C2 | F2 | E2 |
| 3 | B3 | C3 | F3 | E3+$\beta 3$ |
| . | . | . | . | . |

| PROCESS ID | RECEPTION COUNTER VALUE |
|---|---|
| sxx1 | C1 |
| sxx2 | C2 |
| sxx3 | C3 |
| . | . |

| PROCESS ID | SEQUENCE NUMBER | COUNTER VALUE IN INSPECTION FRAME | CORRECTION SEQUENCE NUMBER | RECEIVED CORRECTION VALUE |
|---|---|---|---|---|
| sxx1 | 1 | A1 | - | - |
| sxx2 | 2 | A2 | 1 | $\alpha 2$ |
| sxx3 | 3 | A3 | 2 | $\alpha 3$ |
| sxx4 | . | . | . | . |

| SEQUENCE NUMBER | RECEPTION COUNTER VALUE | COUNTER VALUE AFTER CORRECTION OF CORRECTION APPARATUS |
|---|---|---|
| 1 | C1 | $A1+\alpha 2$ |
| 2 | C2 | $A2+\alpha 3$ |
| 3 | C3 | A3 |
| . | . | . |

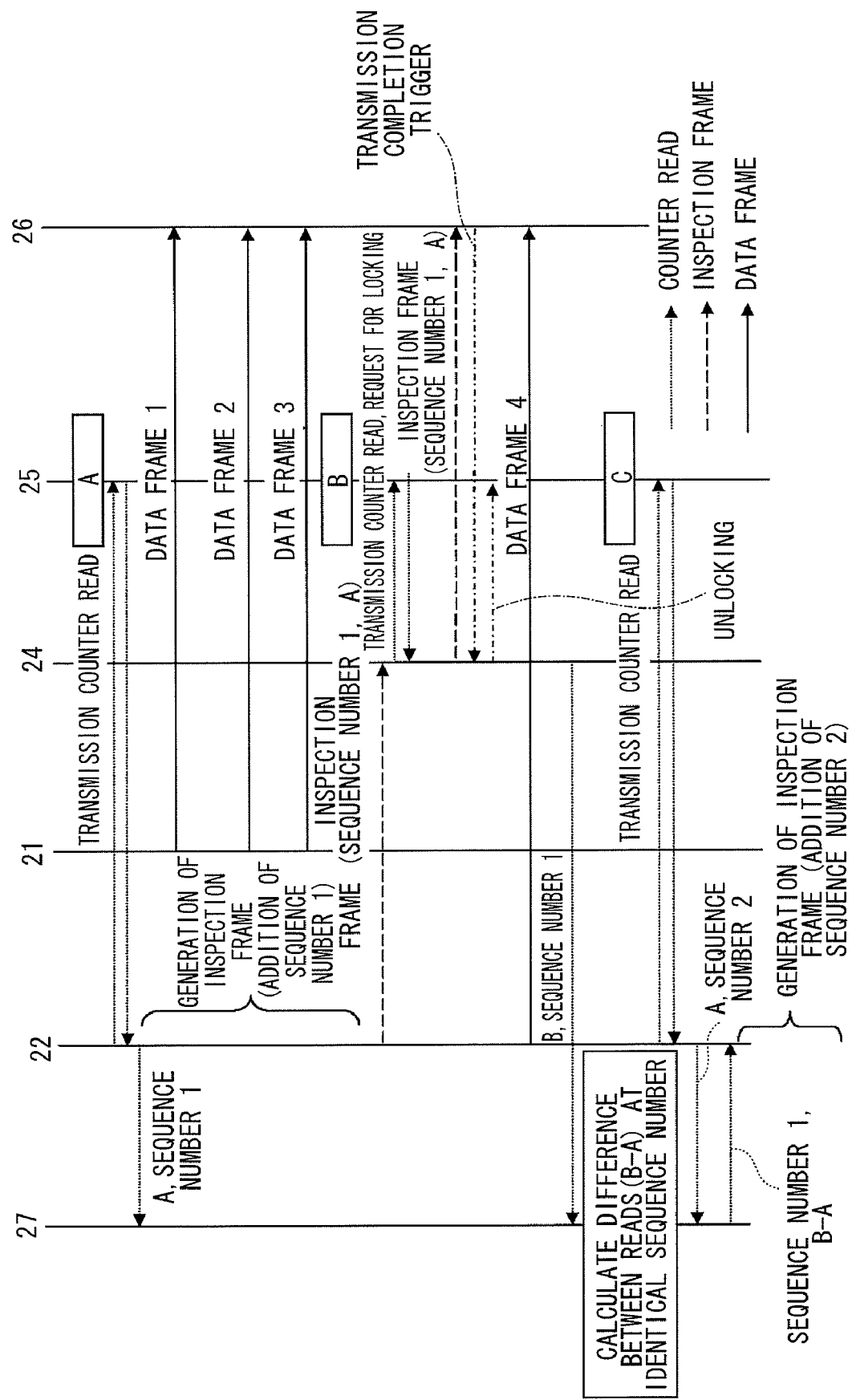

FRAME COUNTER CORRECTION APPARATUS, OPPOSING APPARATUS, AND FRAME COUNTER CORRECTION METHOD

1. BACKGROUND

The present invention relates to a frame counter correction apparatus and an opposing apparatus which are connected to an Ethernet (registered trademark) network, and a frame counter correction method.

2. DESCRIPTION OF THE RELATED ART

Although a network infrastructure has been conventionally built by using transmission systems such as a SONET (Synchronous Optical Network) and a SDH (Synchronous Digital Hierarchy), there has been a trend to substitute Ethernet technology for such transmission systems in recent years. When the Ethernet is to be applied to an metro-Transport network, the Ethernet has been insufficient in OAM (Operation Administration and Maintenance) functions. The OAM functions include, e.g., the function of performing fault management and maintenance of a physical layer in the SONET.

JP-A-2006-197399 describes that a timing of transmission of a measurement packet by a client, a timing of transmission of a response packet by a server, and a timing of reception of the response packet by the client are measured, and a timing of measurement by a timing counter is corrected based on the measurement results.

Y.1731 (ITU-T Y.1731 OAM functions and mechanisms for Ethernet based networks) of ITU-T (International Telecommunication Union-Telecommunications Standardization Sector) defines methods for fault management and maintenance management in order to provide the OAM functions on the Ethernet.

FIG. 1 is a view showing a structure of a point-to-point connection in Y.1731 of ITU-T.

In the following description, when a plurality of NEs (Network Element) 11 are point-to-point connected, a group of the NEs present within an identical management area is referred to as a MEG (ME Group), an end point at which an OAM frame is transmitted or terminated is referred to as a MEP (MEG End Point), an intermediate point of the MEG at which specific OAM frame relay and process can be performed is referred to as a MIP (MEG Intermediate Point), and a management level of the MEG is referred to as a MEG Level.

In FIG. 1, diagonally hatched square blocks represent the MEPs, while diagonally hatched circular blocks represent the MIPs. FIG. 1 illustrates examples of the case where the fault management of the MEG Level 7 is performed at the end point of a Customer, the case where the fault management of the MEG Level 5 is performed at the end point of a Provider, and the case where the fault management of the MEG Level 2 is performed at the end point of an Operator.

FIG. 2 is a view showing a structure of a multi-point connection in Y.1731 of ITU-T. The multi-point connection is applied to a group of the NEs 11 consisting of a plurality of the NEs receiving the identical frame, and the group constituting the multi-point connection is regarded as the identical MEG.

With reference to FIG. 3, a description will be given herein to the case where an inspection frame is transmitted from a MEP A to a MEP B to calculate a frame loss.

Each of the MEP A on the transmission side and the MEP B on the reception side has a transmission counter and a reception counter which count the numbers of passing frames.

At the MEP A on the transmission side, when the inspection frame is generated, a counter value A1 is acquired from the transmission counter and is written to the inspection frame before the inspection frame is transmitted. At the MEP B, when the inspection frame is received, a counter value B1 at that time is acquired from the reception counter. The operation described above is performed twice so that the MEP B on the reception side acquires two transmission counter values A1 and A2 and two reception counter values B1 and B2. From these counter values, the frame loss can be calculated by using the expression shown below:

the number of frame losses=(transmission counter value $A2$–transmission counter value $A1$)–(reception counter value $B2$–reception counter value $B1$).

FIG. 4 is an illustrative view for illustrating a problem related to the measurement of the frame loss. In FIG. 4, (a) a process for reading the transmission counter, (b) a process for generating the inspection frame, and (c) a process for transmitting the inspection frame are arranged in time series.

Since a specific processing time is required from the reading of the transmission counter value to the completion of the generation of the inspection frame, in the case where a normal frame is received and transmitted during the processing time, the transmission counter value is disadvantageously incremented. FIG. 4 illustrates an example of the case where five normal frames pass during the time period from the reading of the transmission counter value to the actual transmission of the inspection frame.

As a result, at the MEP B on the reception side, the reception counter value measured at the time of reception of the inspection frame results in a value higher than an expected value (the counter value A1 (or A2) written to the inspection frame) by "5". In other words, the reception counter value B2 in this case is given by B2=A2+5. When the frame loss is calculated according to the expression described above, the frame loss=(A2–A1)–(A2+5–B1) is satisfied. Since the expected value satisfies B1=A1, the value of the frame loss is as follows:

frame loss=$(A2-A1)-(A2+5-A1)=-5$.

Thus, the value of the frame loss becomes negative so that an error occurs in the measurement of the frame loss. The problem mentioned above becomes conspicuous in the cases shown below: (1) the case where the generation unit of the inspection frame and the transmission unit of the inspection frame are comprised of different pieces of hardware and the performance of a bus of the hardware depends on the internal architecture; (2) the case where the generation unit of the inspection frame is comprised of an inexpensive processor so that a long time period is required to generate the inspection frame; (3) the case where the generation of the inspection frame and the transmission of the inspection frame are comprised of software so that the processing speed is limited; and (4) the case where the transmission counter is comprised of hardware and the generation of the inspection frame is comprised of software. In addition, passing through an API (Application Program Interface) also lowers the speed of reading the transmission counter value.

The foregoing problem can be circumvented by storing the normal frame in a buffer during the time period from the reading of the transmission counter value to the transmission of the inspection frame, as shown in FIG. 5.

However, the method increases delay in the transmission of the normal frame and lowers the communication speed.

A task of the present invention is to allow the measurement of the frame loss with precision.

3. SUMMARY

A frame counter correction apparatus connected to an Ethernet network, comprises transmission counter means for counting a number of frames to be transmitted; inspection frame generation means for generating an inspection frame for measuring a frame loss; and transmission counter correction means for calculating a difference between a counter value of the transmission counter means at a time of generation of the inspection frame and the counter value of the transmission counter means at a time of transmission of the inspection frame, and adding a calculated difference value and information for specifying the inspection frame as a correction target to another inspection frame.

4. BRIEF DESCRIPTION OF THE DRAWINGS

Figure 21:
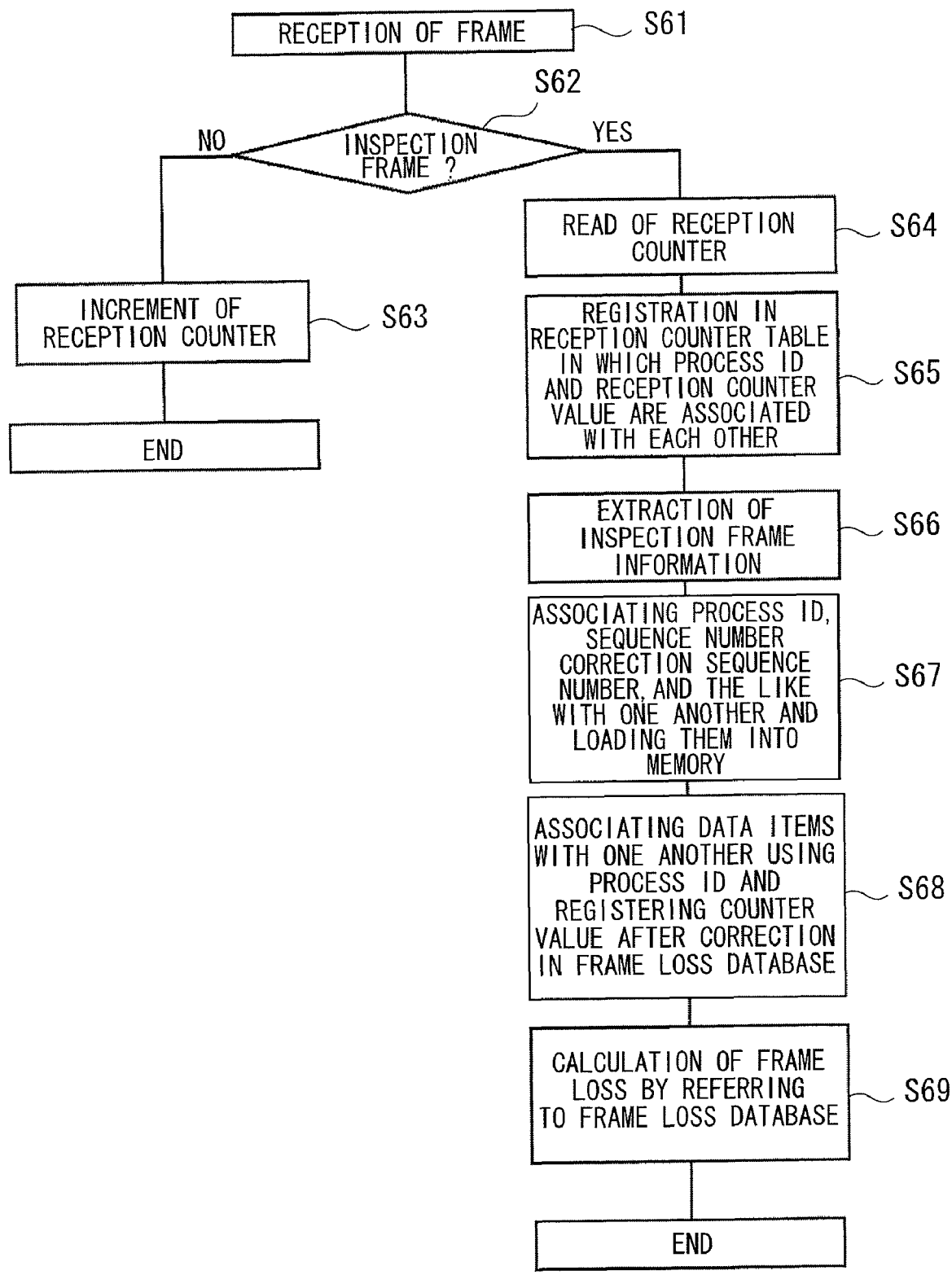

FIGS. 19A, 19B, and 19C show structures of databases of the frame counter correction apparatus;

FIGS. 20A, 20B, and 20C show structures of databases of the frame counter correction apparatus;

FIG. 21 is a flow chart of the opposing apparatus;

FIGS. 22A, 22B, and 22C show structures of databases of the opposing apparatus; and FIG. 23 is a view showing a process sequence of a frame counter correction apparatus according to a third embodiment.

5. DETAILED DESCRIPTION OF THE EMBODIMENTS

Best Mode for Carrying Out the Invention

Figure 6:
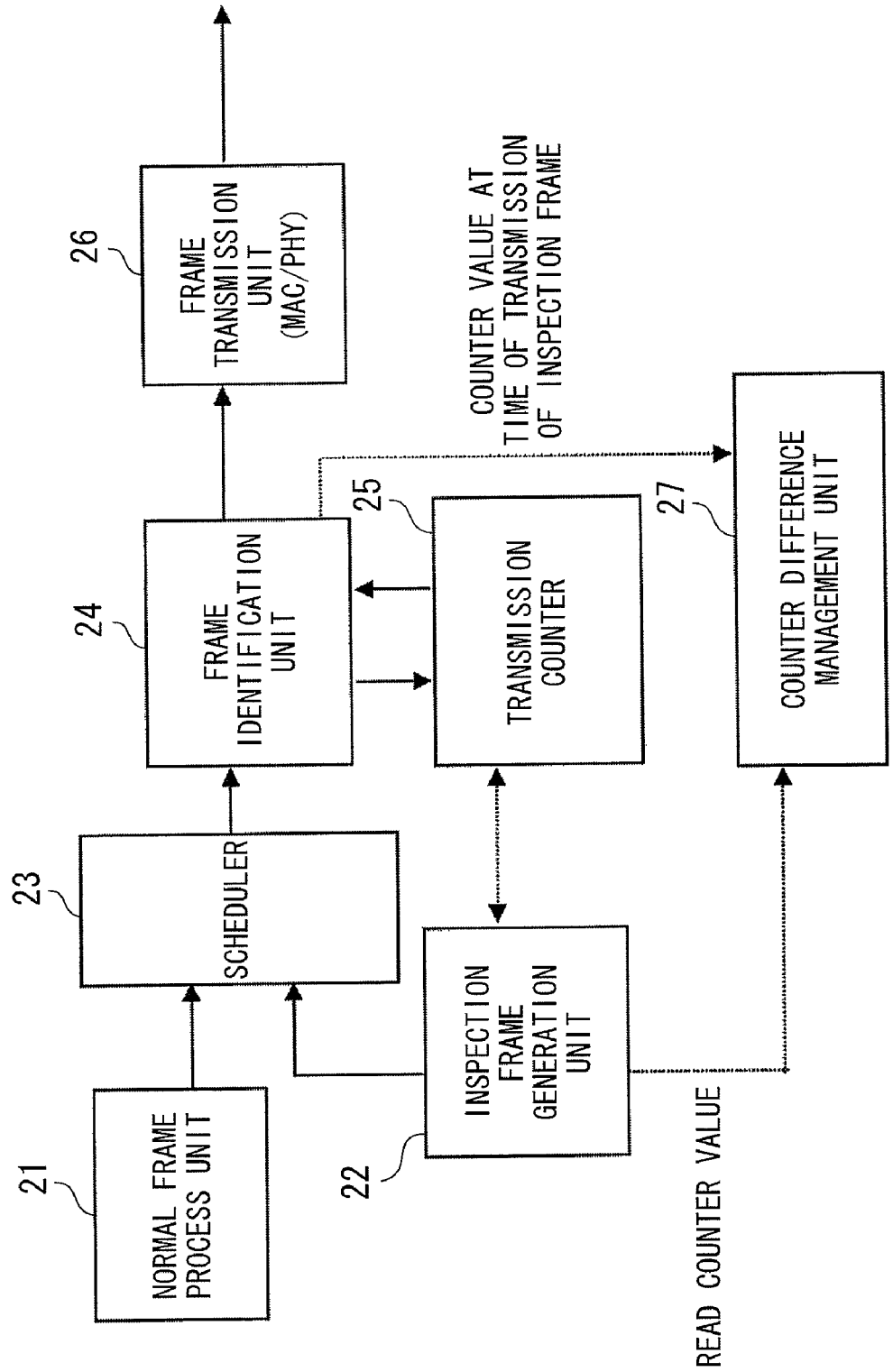
FIG. 6 is a view showing a structure of a frame counter correction apparatus according to a first embodiment.

Preferred embodiments of the present invention will be described hereinbelow. FIG. 6 is a view showing a structure of a frame counter correction apparatus 20 according to a first embodiment.

Figure 1:
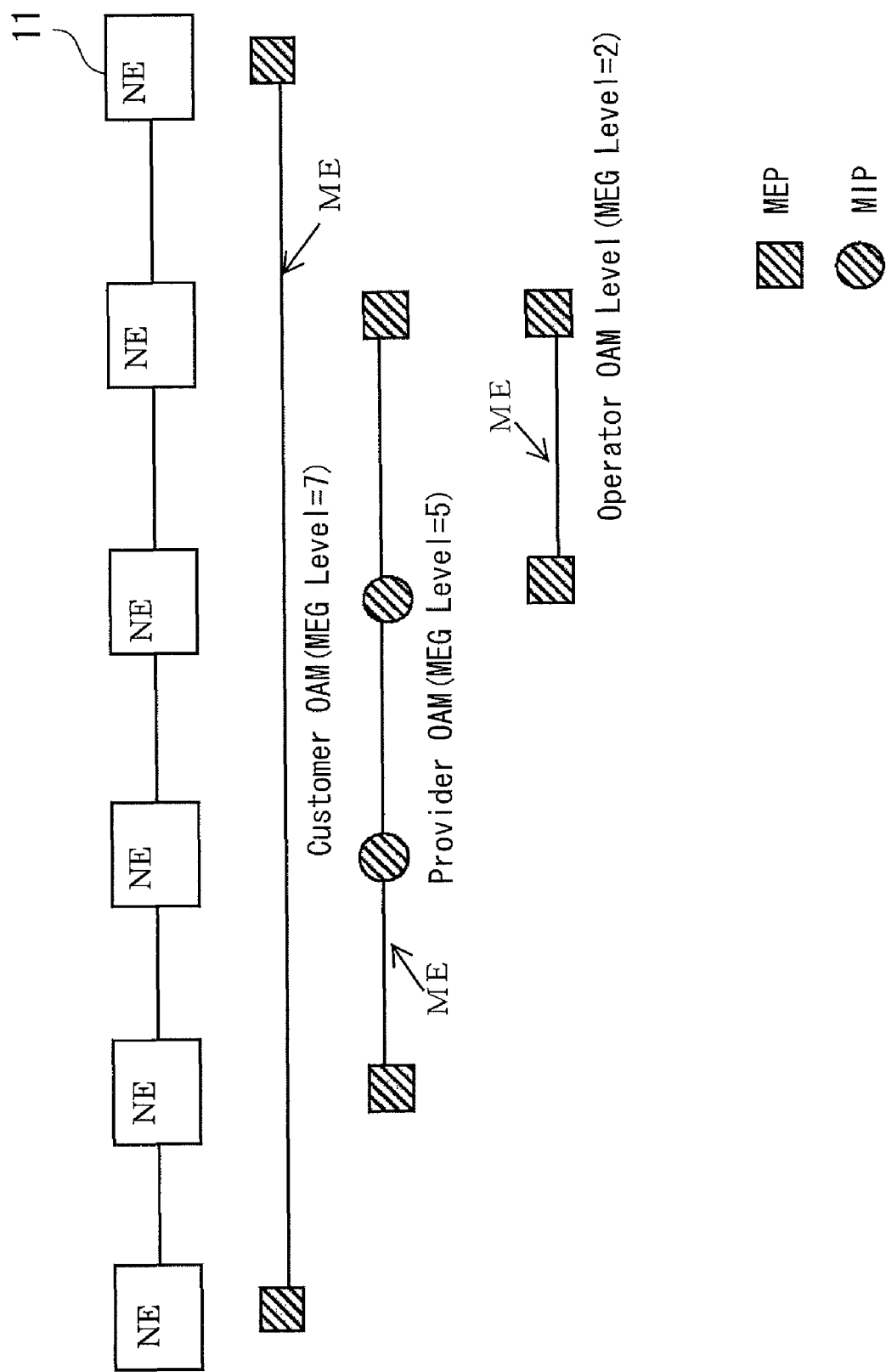
FIG. 1 is a view showing a structure of a point-to-point connection in Y.1731 of ITU-T.
Figure 2:
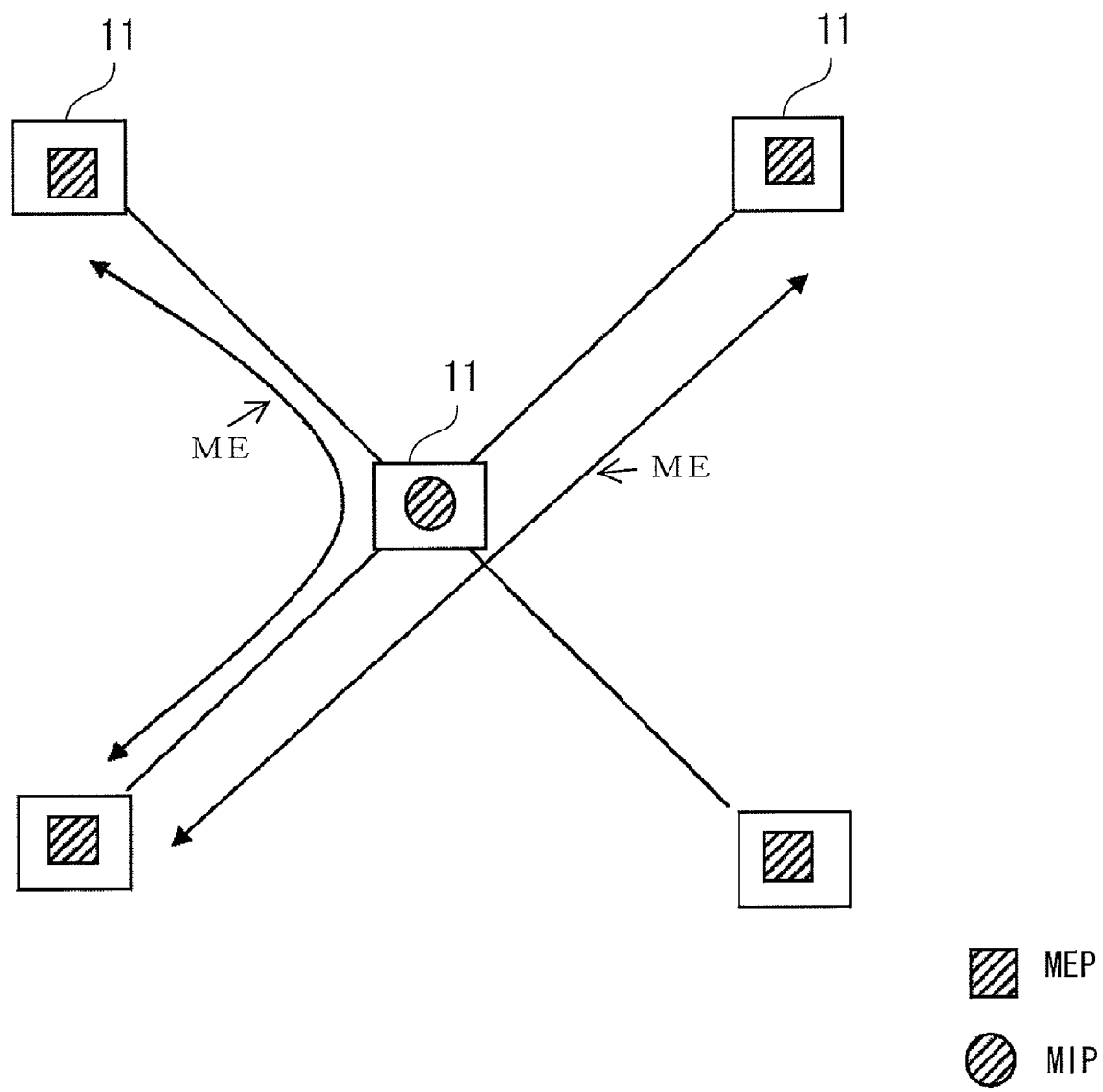
FIG. 2 is a view showing a structure of a multi-point connection.
Figure 3:
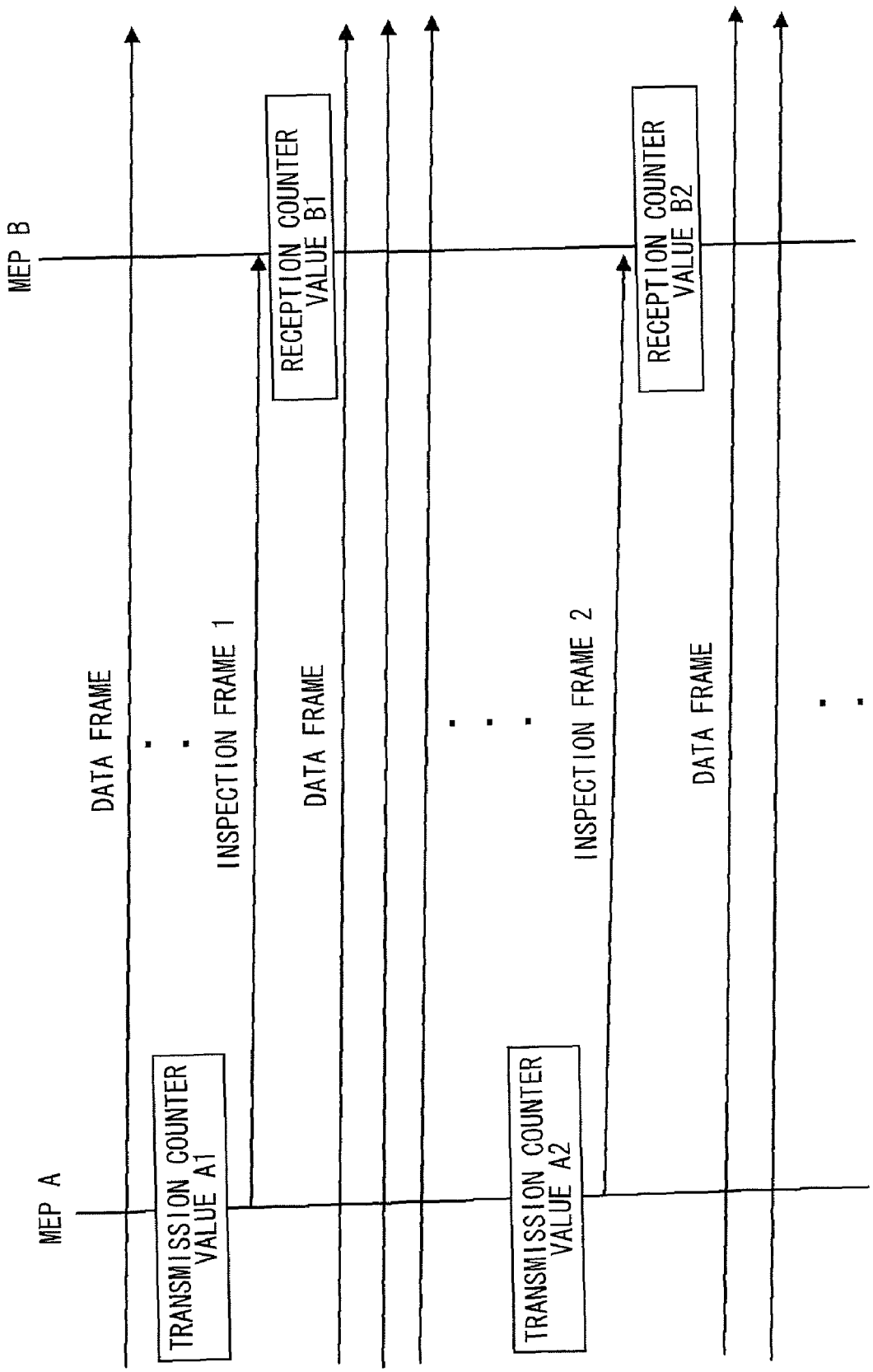
FIG. 3 is an illustrative view for illustrating a method for calculating a frame loss.
Figure 4:
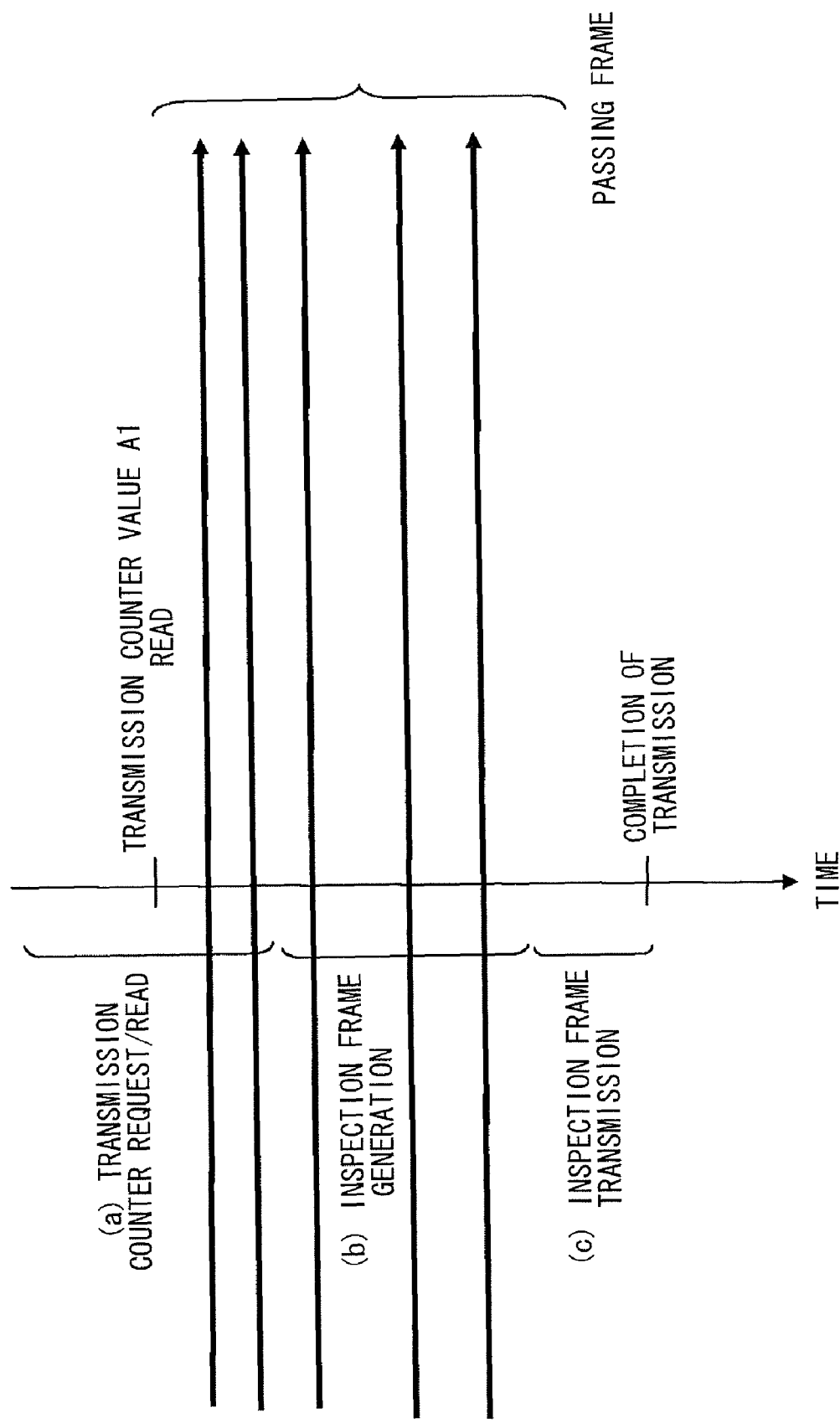
FIG. 4 is an illustrative view for illustrating a problem in the measurement of the frame loss.
Figure 5:
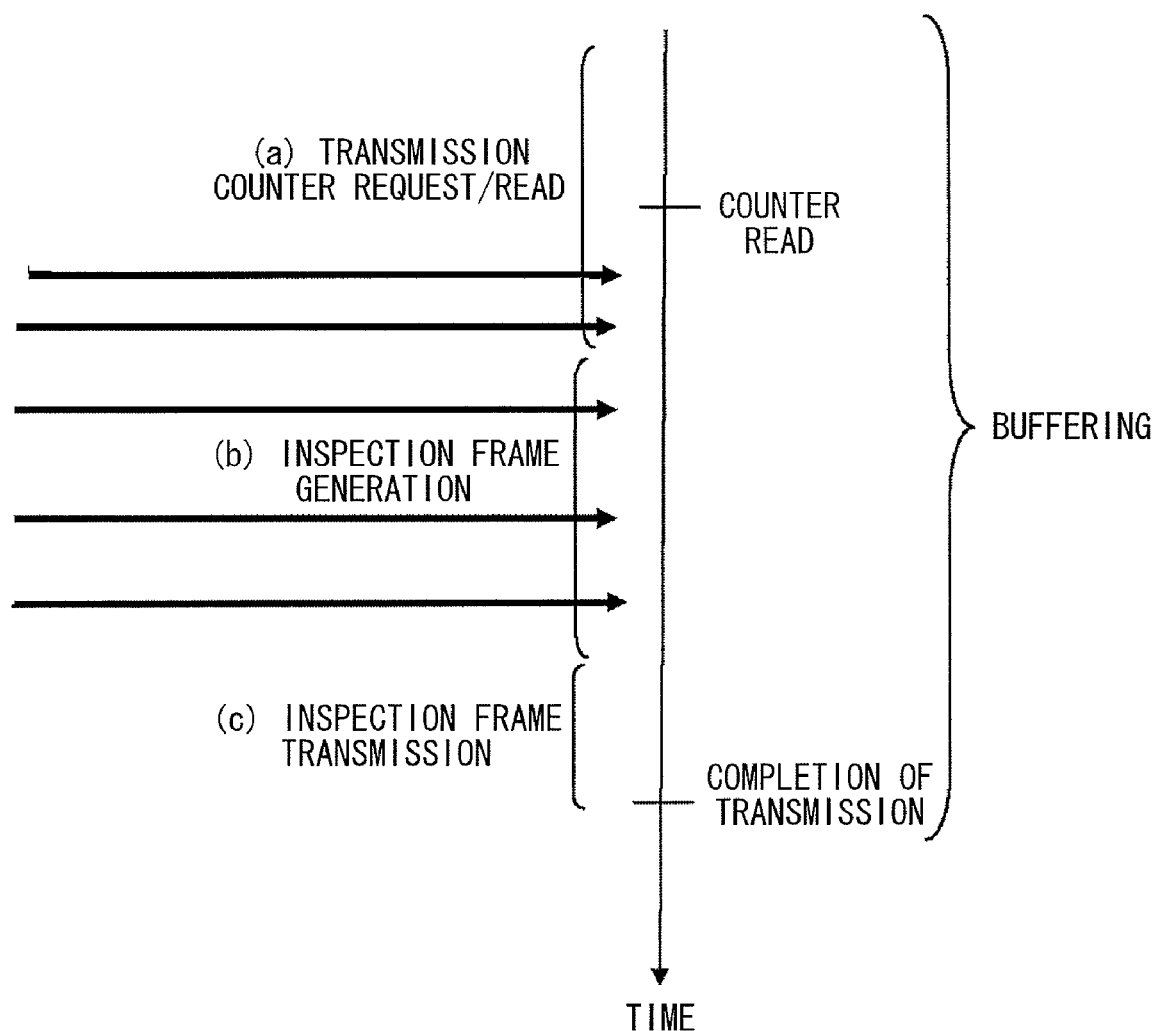
FIG. 5 is an illustrative view for illustrating the case where a normal frame is buffered.

The embodiments, which will be described hereinbelow, provide OAM (Operation Administration and Maintenance) functions based on Y.1731 of ITU-T in a trunk communication system using the Ethernet. The frame counter correction apparatus 20 of the first embodiment may be embedded in a ME (Maintenance Entity) of FIG. 1 or FIG. 2.

The frame counter correction apparatus 20 includes a normal frame process unit 21, an inspection frame generation unit 22, a scheduler 23, a frame identification unit 24, a transmission counter 25, a frame transmission unit 26, and a counter difference management unit 27. These circuit blocks may be composed of hardware and/or software.

The normal frame process unit 21 performs a process with respect to the normal frame, and outputs the process result to the scheduler 23. The inspection frame generation unit 22 generates the inspection frame and outputs the inspection frame to the scheduler 23 at predetermined time intervals or at an instructed timing. The inspection frame generation unit 22 reads a value of the transmission counter 25 and writes the counter value and a sequence number for specifying the inspection frame to the inspection frame at the time of generation of the inspection frame. Further, the inspection frame generation unit 22 outputs the counter value read from the transmission counter 25 to the counter difference management unit 27.

The scheduler 23 schedules the normal frame and the inspection frame and outputs them to the frame identification unit 24.

The frame identification unit 24 identifies whether the received frame is the inspection frame or the normal frame, increments the transmission counter 25 when the received frame is identified as the normal frame, and outputs the received frame to the frame transmission unit 26. Conversely, when the received frame is identified as the inspection frame, the frame identification unit 24 reads the value of the transmission counter 25 and outputs the read counter value to the counter difference management unit 27 and, at the same time, outputs the inspection frame to the frame transmission unit 26.

The counter difference management unit 27 calculates the difference between the value of the transmission counter 25 at the time of generation of the inspection frame and the value of the transmission counter 25 at the time of transmission of the inspection frame and, when there is a difference therebetween, outputs the difference value and information for specifying the inspection frame as a correction target (e.g., sequence number) to the inspection frame generation unit 22. With this operation, the inspection frame generation unit 22 can generate the inspection frame containing the information for specifying the inspection frame as the correction target and the difference value. A part of the functions of the counter difference management unit 27 and the inspection frame generation unit 22 corresponds to transmission counter correction means.

Figure 7:
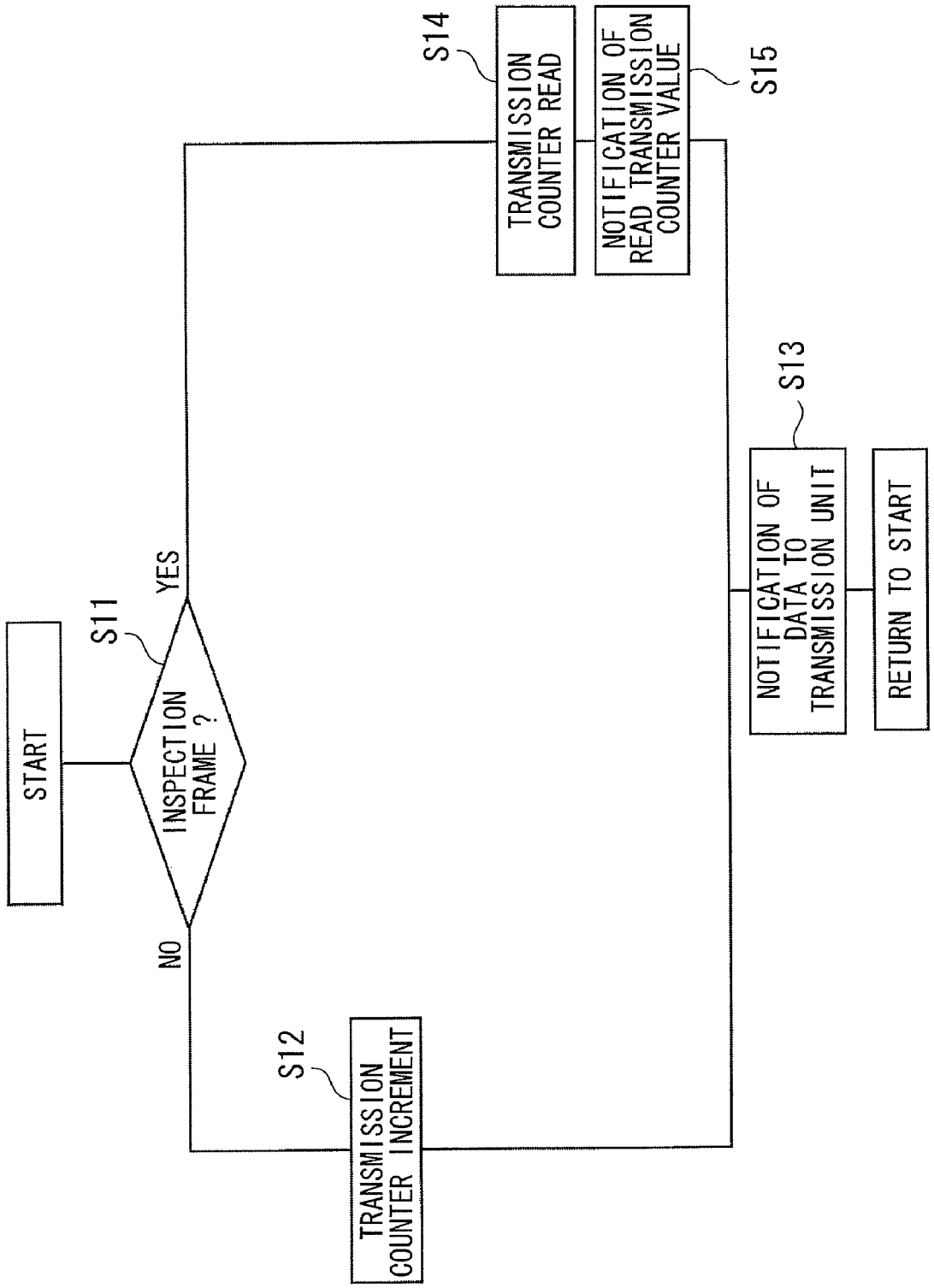
FIG. 7 is a flow chart of a frame identification unit.

The frame transmission unit 26 sends out the normal frame and the inspection frame to the Ethernet network. FIG. 7 is a flow chart showing a process operation of the frame identification unit 24 of the frame counter correction apparatus 20.

The frame identification unit 24 determines whether or not a source MAC (Media Access Control) address is coincident with a MAC address of the frame identification unit 24 (FIG. 7, S11). When the source MAC address is not coincident, the process flow moves to a step S12 where the transmission counter 25 is incremented. Then, the received frame is outputted to the frame transmission unit 26 (S13).

When the source MAC address is coincident with the MAC address of the frame identification unit 24, it is determined whether or not the received frame is the inspection frame. When the received frame is the inspection frame (S11, YES), the process flow moves to a step S14 where the value of the transmission counter 25 is read. Then, the read value of the transmission counter 25 is notified to the counter difference management unit 27 (S15). Thereafter, in the step S13, the inspection frame is outputted to the frame transmission unit 26.

Figure 8:
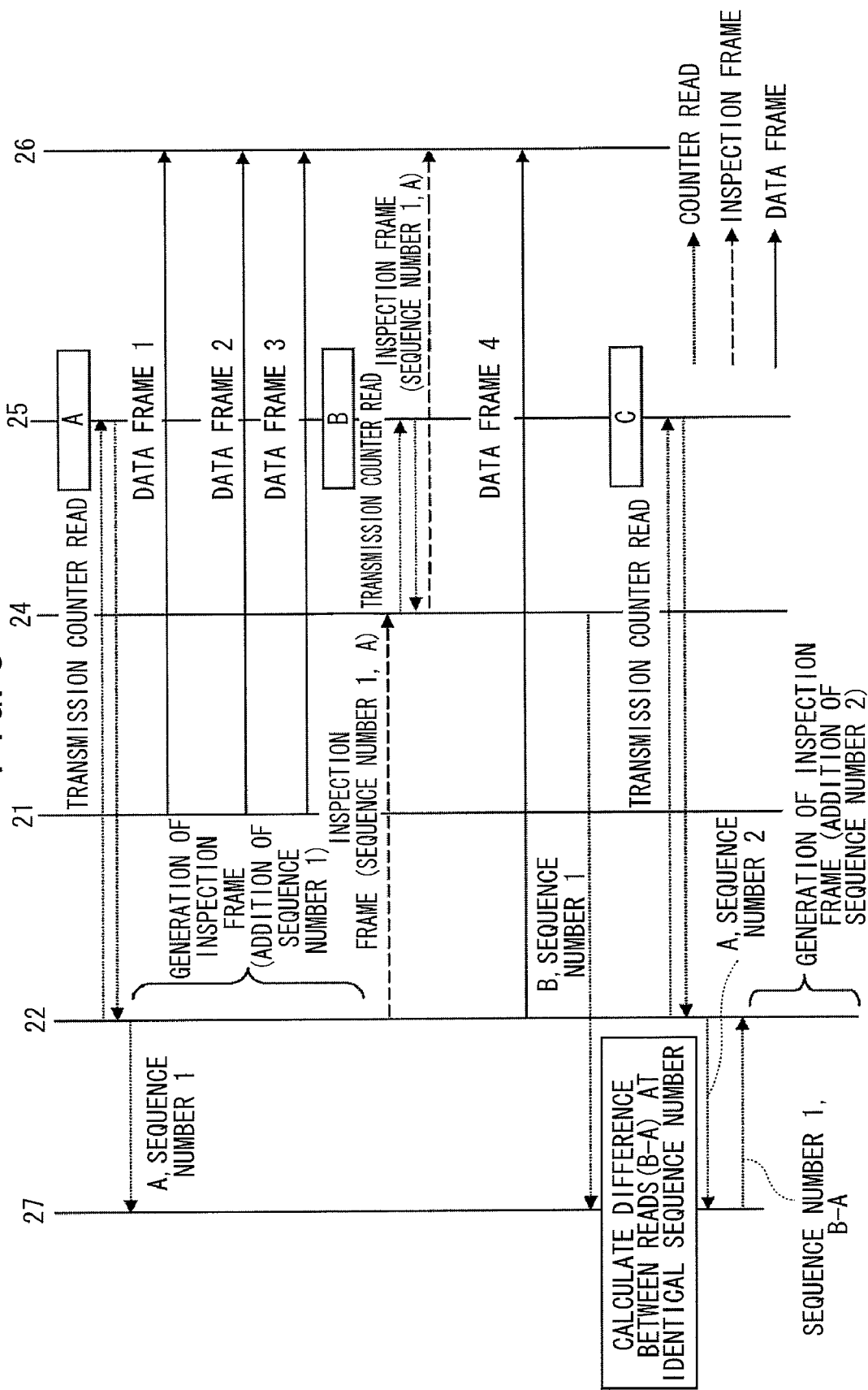
FIG. 8 is a view showing a process sequence of the frame counter correction apparatus.

FIG. 8 is a view showing a process sequence of the frame counter correction apparatus 20. The inspection frame generation unit 22 reads the value of the transmission counter 25 (e.g., A) at the time of generation of the inspection frame. Then, the inspection frame generation unit 22 generates the inspection frame and stores the sequence number specific to the inspection frame and the counter value of the transmission counter 25 in the inspection frame. In addition, the inspection frame generation unit 22 outputs the sequence number of the generated inspection frame and the value of the transmission counter 25 to the counter difference management unit 27.

When the normal frame is received during the generation of the inspection frame in the inspection frame generation unit 22, the normal frame process unit 21 outputs the received normal frames (three normal frames in this case) to the frame transmission unit 26. In the example shown in FIG. 8, three frames which are indicated as data frames 1 to 3 are outputted to the frame transmission unit 26.

When the inspection frame generation unit 22 sends out the inspection frame (e.g., the sequence number 1, the counter value A) to the frame identification unit 24, the frame identification unit 24 identifies whether the received frame is the inspection frame or the normal frame. When the received frame is identified as the normal frame, the frame identification unit 24 gives an instruction for incrementing the counter value to the transmission counter 25. Conversely, when the received frame is determined as the inspection frame, the frame identification unit 24 reads the counter value of the transmission counter 25 and outputs the read counter value and the sequence number of the inspection frame to the counter difference management unit 27. After these processes are completed, the frame identification unit 24 outputs the inspection frame to the frame transmission unit 26.

In the transmission counter 25, the reading operation may be locked when the counter value has been read by the frame identification unit 24, and the reading operation may be unlocked when the transmission of the inspection frame has been completed.

On reception of two counter values (e.g., A and B) which are associated with the identical sequence number, the counter difference management unit 27 then calculates the difference between the two counter values, and stores the calculated difference value in a memory or the like in association with the sequence number.

At the time of generation of the next inspection frame, the inspection frame generation unit 22 reads the counter value of the transmission counter 25 and outputs the sequence number of the inspection frame and the read counter value to the counter difference management unit 27.

The counter difference management unit 27 outputs the sequence number of the inspection frame that has been transmitted and the difference of the counter value to the inspection frame generation unit 22.

When there is the difference of the counter value, the inspection frame generation unit 22 adds the sequence number of the inspection frame as the correction target and the correction value to the next inspection frame and outputs it to the scheduler 23.

Thus, by transmitting the inspection frame onto which the sequence number of the inspection frame as the correction target and the difference value have been written, an opposing apparatus on the reception side can specify the inspection frame as the correction target from the sequence number of the inspection frame as the correction target added to the inspection frame, acquire the correction value of the counter value of the inspection frame, and correct the counter value of the inspection frame as the correction target. With the operation, in the opposing apparatus on the reception side, based on the value of a reception counter at the time of reception of the inspection frame and the corrected value of the inspection frame, the frame loss can be measured with precision.

A description will be given herein to an OAM PDU common format and a frame format of the inspection frame.

Figure 9:
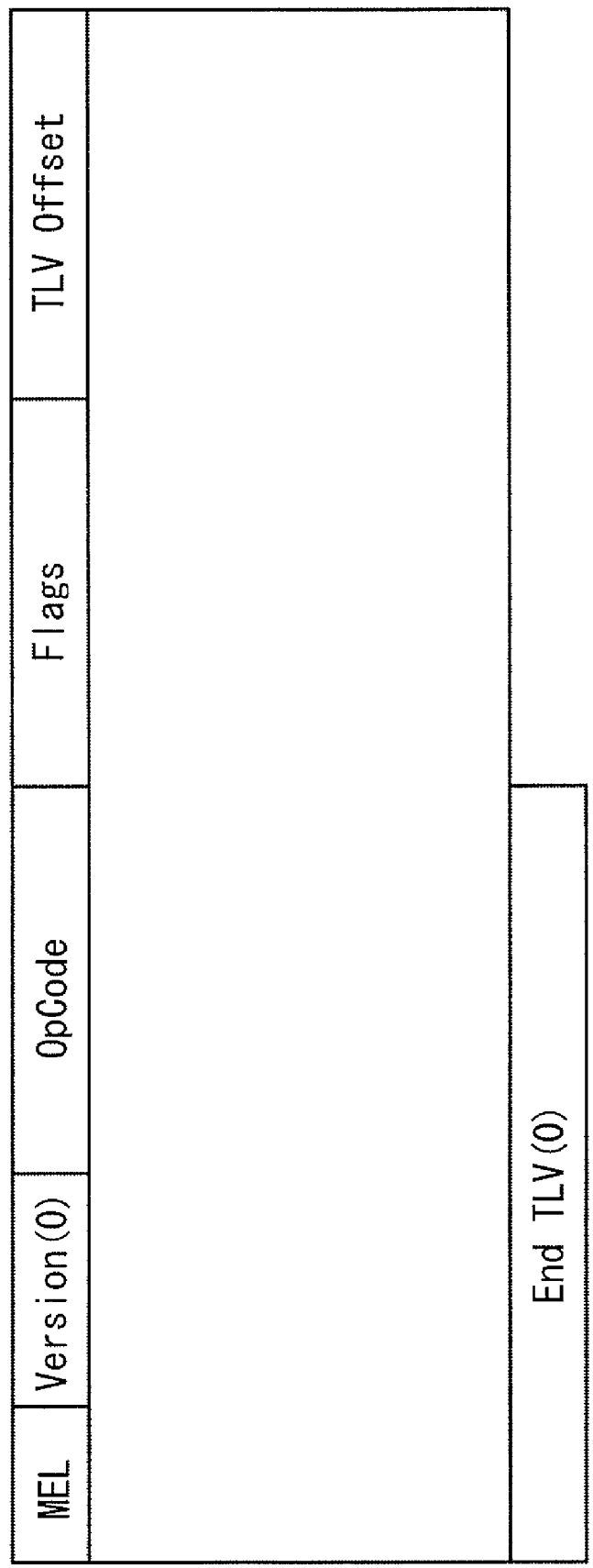
FIG. 9 is a view showing an OAM PDU common format.

FIG. 9 is a view showing the OAM PDU (Protocol Data Unit) common format.

The OAM PDU common format stores a MEG Level ("MEL"), a version, an opcode indicative of a type of the PDU, a TLV (Type, Length, and Value) offset, and the like.

Figure 10:
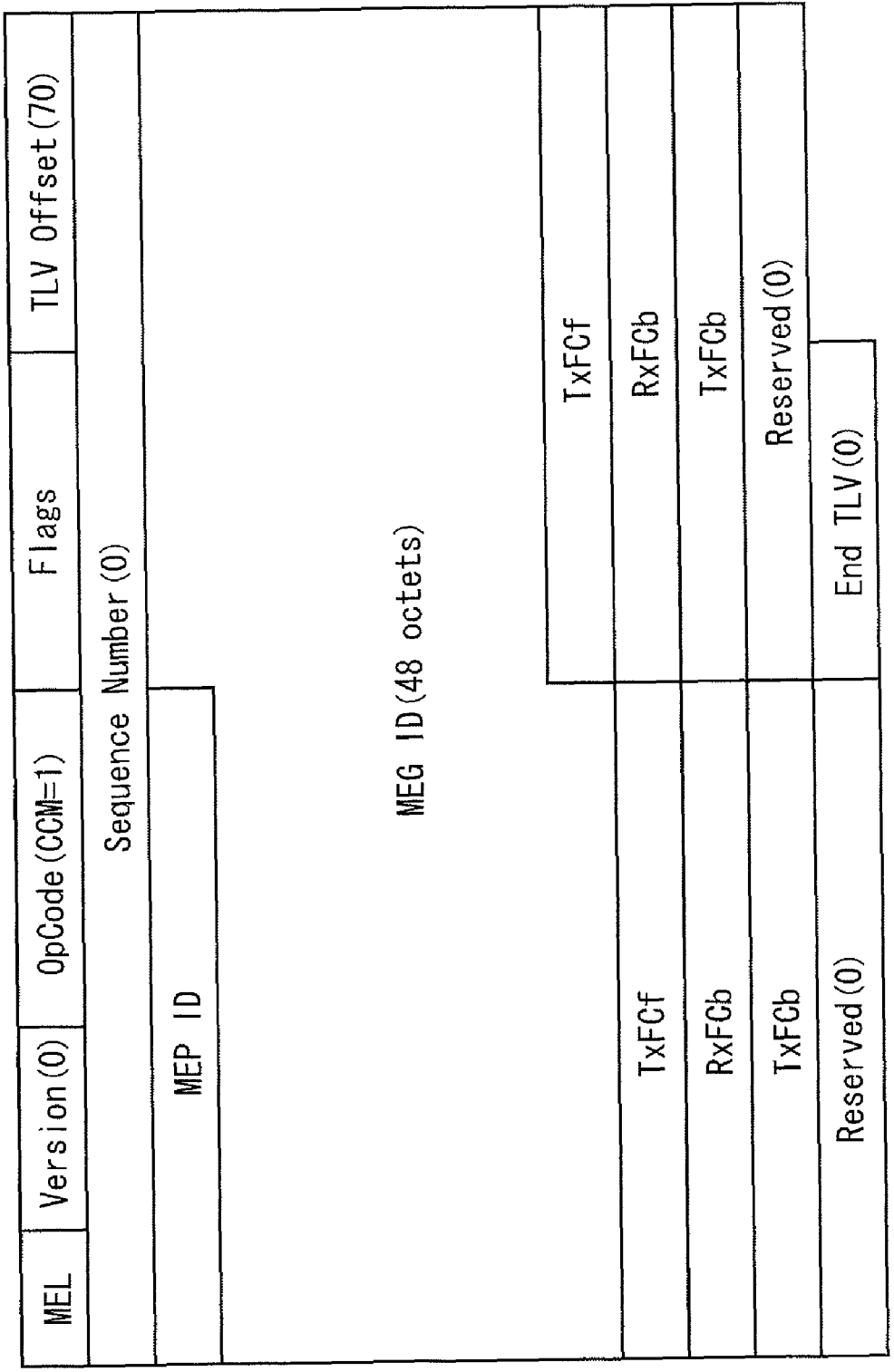
FIG. 10 is a view showing a CC frame format.

FIG. 10 is a view showing a format of a CC (Continuity Check) frame.

The CC frame includes a MEL, a version (0), an opcode (CCM=1), flags, a TLV offset, a sequence number, a MEP ID, a MEG ID, a TxFCf, a RxFCb, a TxFCb, and the like. Typically, "0" is set as the sequence number.

In the MEP ID, an ID of a frame correction apparatus 21 which transmits the CC frame is stored, while in the TxFCf, RxFCb, and TxFCb, counter values notified by the CC frame are stored.

Figure 11:
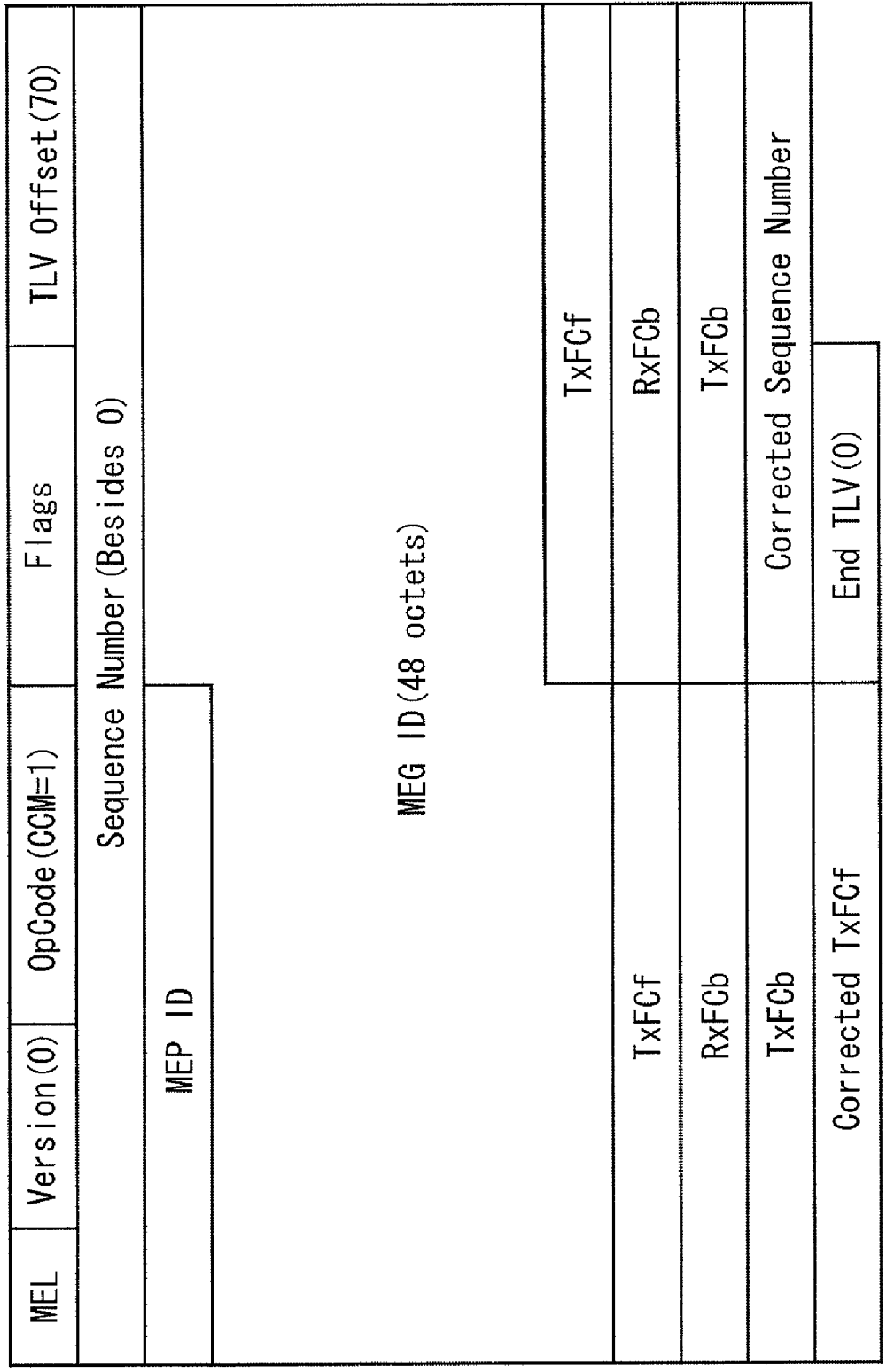
FIG. 11 is a view showing a measurement format of the CC frame.

FIG. 11 is a view showing a measurement format of the CC frame (inspection frame) according to the embodiment. The measurement format is different from the CC frame of FIG. 10 in that a value other than "0" is stored in the area where the sequence number is stored, and the sequence number of the inspection frame as the correction target and the correction value (difference value) are stored in a reserved area (Reserved).

As the sequence number in the CC frame of FIG. 11, a value which is sequentially incremented such as 1, 2, 3 . . . is stored. In the reserved area, the sequence number of the inspection frame as the correction target (Corrected Sequence Number) and the difference value of the counter value (Corrected TxFCf) are stored. On the reception side, it is possible to identify which counter value of the inspection frame needs to be corrected from the sequence number and the difference value which are stored in the reserved area.

Figure 12:
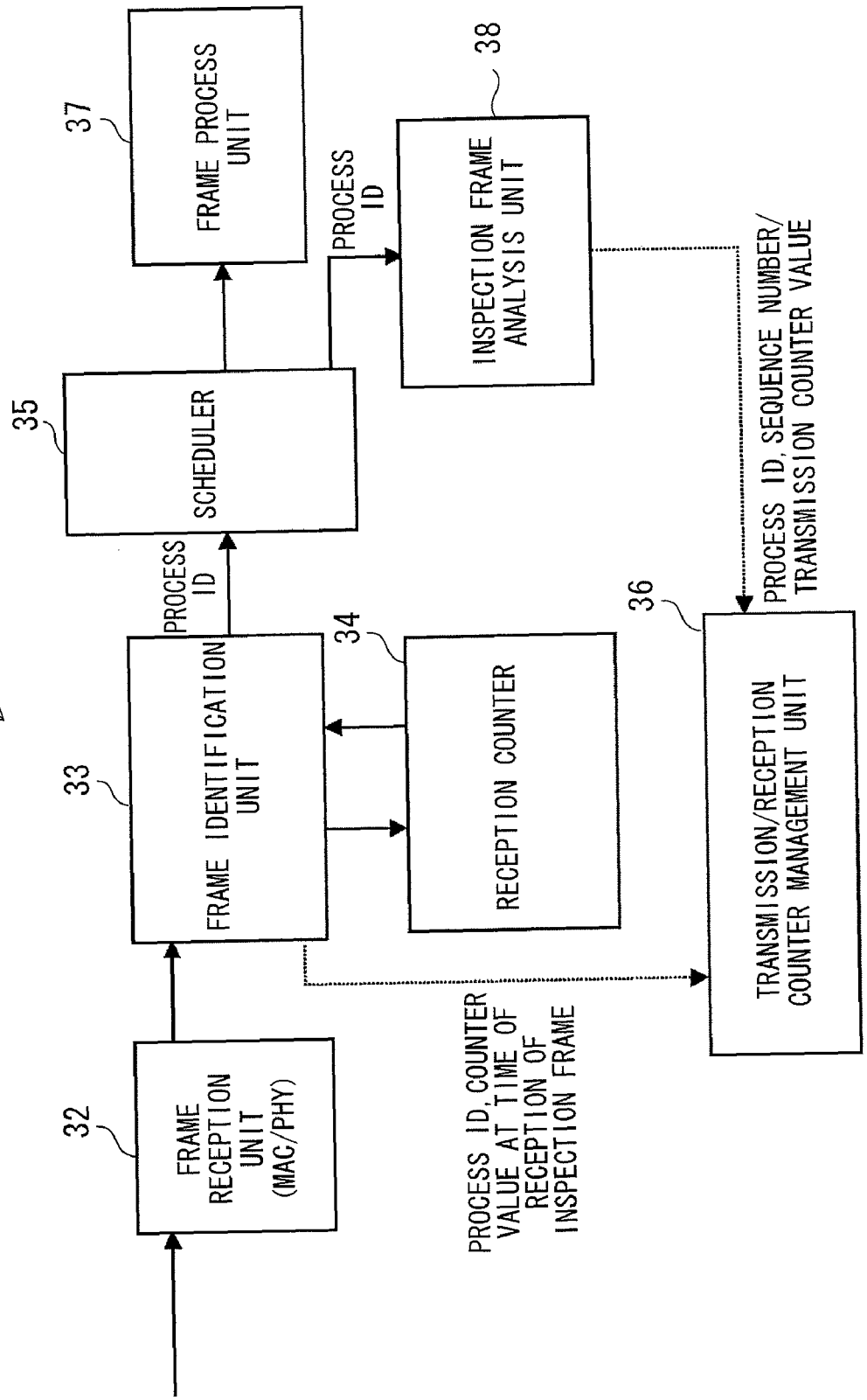
FIG. 12 is a view showing a structure of an opposing apparatus according to the embodiment.

Next, FIG. 12 is a view showing a structure of an opposing apparatus (MEP) of the embodiment. The opposing apparatus 31 includes a frame reception unit 32, a frame identification unit 33, a reception counter 34, a scheduler 35, a transmission/reception counter management unit 36, a frame process unit 37 and an inspection frame analysis unit 38. These blocks may be comprised of hardware, or a part or all of them may be comprised of software.

The frame reception unit 32 outputs the received frame to the frame identification unit 33. The frame identification unit 33 identifies whether the received frame is the normal frame or the inspection frame. When the normal frame is received, the frame identification unit 33 gives an instruction for incrementing the counter value to the reception counter 34, and outputs the received normal frame to the scheduler 35. When the inspection frame is received, the frame identification unit 33 reads the counter value of the reception counter 34, outputs the read counter value to the transmission/reception counter management unit 36 in association with a process ID and, at the same time, outputs the inspection frame and the process ID to the scheduler 35.

The scheduler 35 outputs the normal frame to the frame process unit 37 and outputs the inspection frame and the process ID to the inspection frame analysis unit 38.

The inspection frame analysis unit (corresponding to acquisition means) 38 acquires the sequence number of the inspection frame (and the sequence number of the inspection frame as the correction target) and the transmission counter value, and outputs these data items and the process ID to the transmission/reception counter management unit 36.

The transmission/reception counter management unit (corresponding to transmission/reception counter management means) 36 associates the transmission counter value stored in the inspection frame with the reception counter value outputted from the frame identification unit 33, and stores them in a database. It is to be noted that the association of the transmission counter value with the reception counter value in the transmission/reception counter management unit 36 is performed by using the process ID issued by the frame identification unit 33 at the time of arrival of the inspection frame.

When the transmission/reception counter management unit 36 acquires the reception counter value and the sequence number of the next inspection frame, and the sequence number and the difference value of the counter value of the inspection frame as the correction target, the transmission/reception counter management unit 36 then reads the reception counter value and the transmission counter value of the identical sequence number which are stored in the database and corrects the transmission counter value of the corresponding inspection frame by using these data items. With this operation, pairs of the correct transmission counter values and the correct reception values can be stored and the frame loss can be measured with precision from these counter values.

Figure 13:
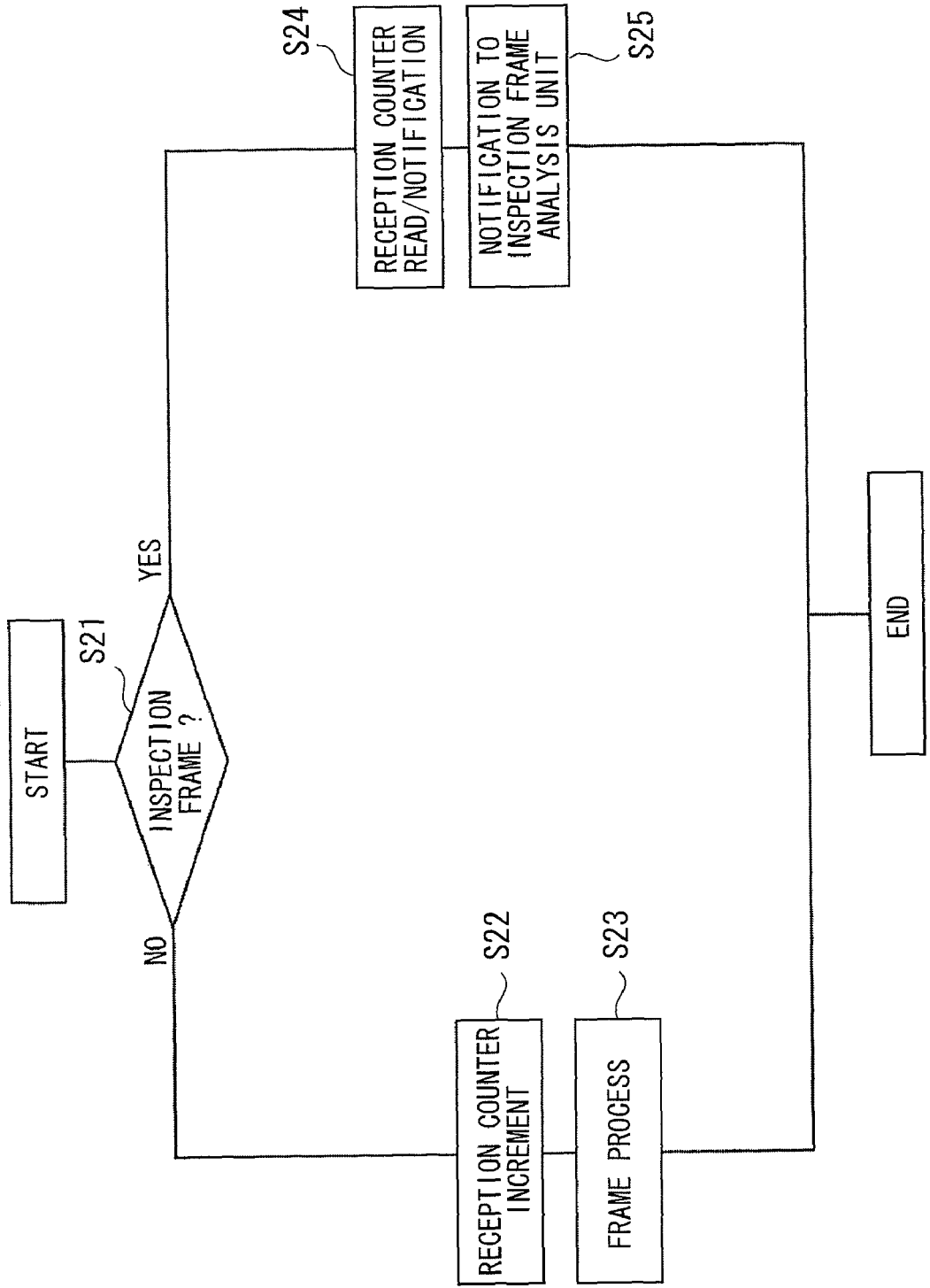
FIG. 13 is a flow chart of the frame identification unit and a scheduler.

FIG. 13 is a flow chart showing a process operation of the frame identification unit 33 of the opposing apparatus 31.

The frame identification unit 33 identifies the destination MAC address of the received frame (FIG. 13, S21). When the destination MAC address is not coincident with a MAC address of the frame identification unit 33 (S21, NO), the process flow moves to a step S22 where the reception counter 34 is incremented and the received frame is outputted to the scheduler 35. With respect to the frame outputted to the scheduler 35, a normal frame process is performed (S23).

When the destination MAC address is coincident with the MAC address of the frame identification unit 33, it is determined whether or not the frame is the inspection frame. When the frame is determined to be the inspection frame (S21, YES), the process flow moves to a step S24 where the value of the reception counter 34 at that time is read, and the counter value and the process ID are outputted to the transmission/reception counter management unit 36. In addition, the inspection frame and the process ID are also outputted to the inspection frame analysis unit 38 (S25).

Figure 14:
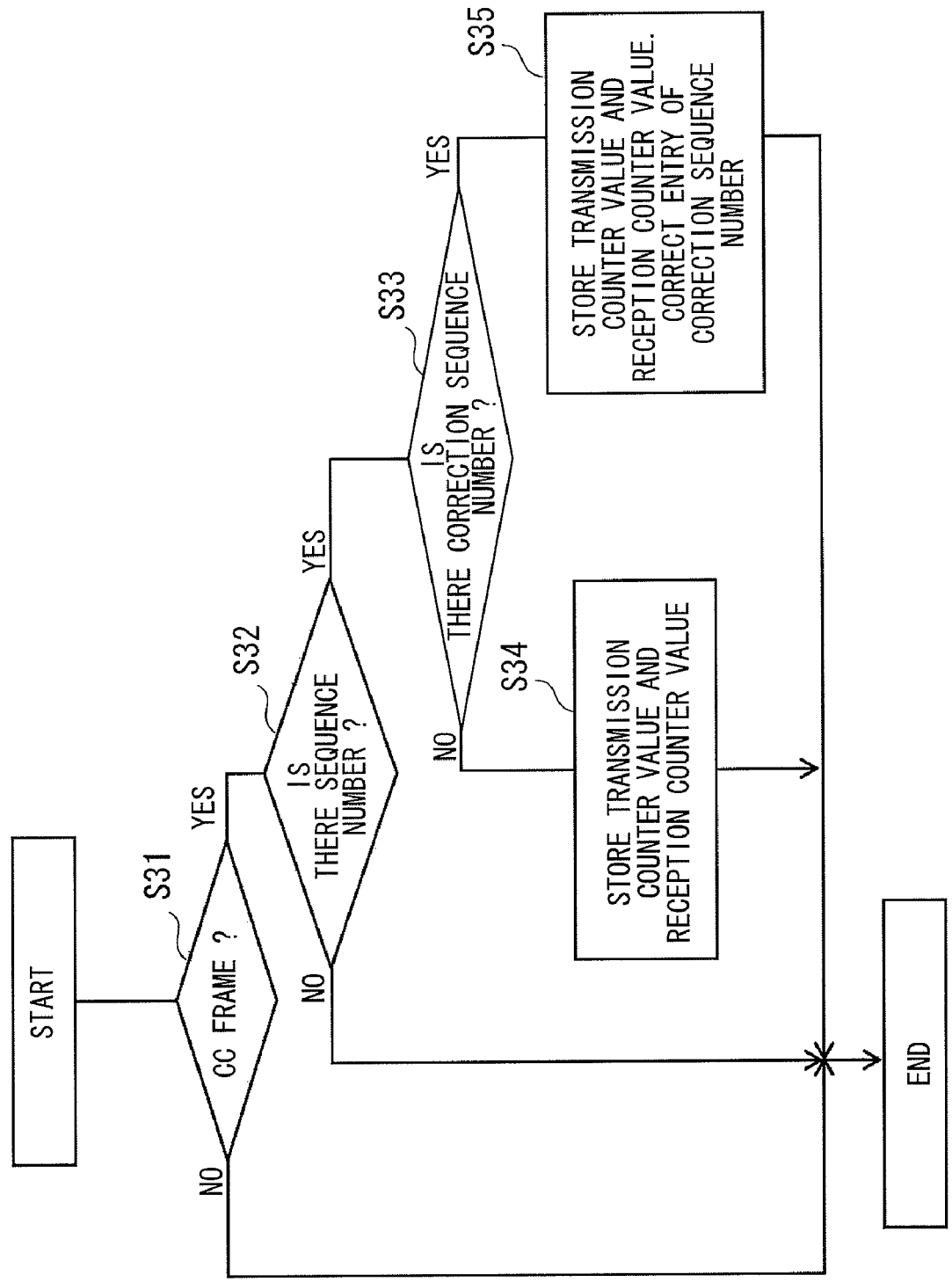
FIG. 14 is a flow chart of an inspection frame analysis unit.

FIG. 14 is a flow chart showing a process operation of the inspection frame analysis unit 38. The inspection frame analysis unit 38 determines whether or not the received frame is the CC frame (FIG. 14, S31). When the received frame is determined to be the CC frame (S31, YES), the process flow moves to a step S32 where it is determined whether or not the sequence number is stored in the inspection frame.

When the sequence number is stored (S32, YES), the process flow moves to a step S33 where it is further determined whether or not the correction sequence number is stored in the inspection frame.

When the correction sequence number is not stored (S33, NO), the process flow moves to a step S34 where the transmission counter value of the frame counter correction apparatus 20 and the reception counter value of the opposing apparatus 31 which are stored in the inspection frame are acquired, and these data items are associated with the process ID and stored in a storage device such as a memory or the like.

On the other hand, when the correction sequence number is stored in the inspection frame (S33, YES), the process flow moves to a step S35 where the transmission counter value of the frame counter correction apparatus 20 and the reception counter value of the opposing apparatus 31 which are stored in the inspection frame are acquired, and these data items are associated with the process ID and stored in the storage device. Further, an entry having the sequence number as a key is added to the database and data having the sequence number corresponding to the correction sequence number in the entry is updated based on the correction value (difference of the counter value) of the inspection frame.

Figure 15:
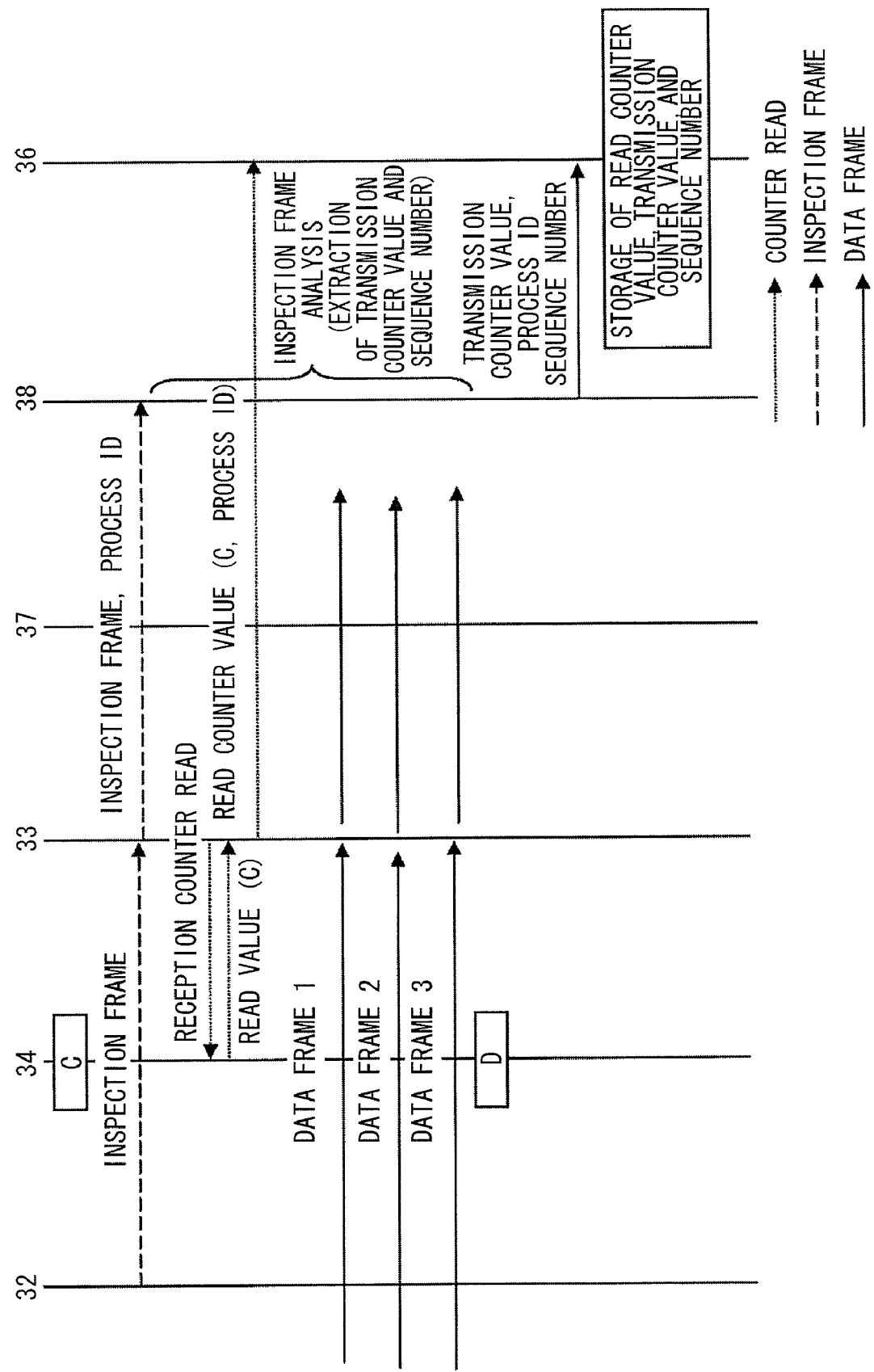
FIG. 15 is a view showing a process sequence of the opposing apparatus.

FIG. 15 is a view showing a process sequence of the opposing apparatus 31. On reception of the inspection frame, the frame identification unit 33 reads the counter value of the reception counter 34, adds the process ID to the read counter value (e.g., C), and outputs the read counter value to the transmission/reception counter management unit 36.

The process sequence of FIG. 15 illustrates the case where data frames 1 to 3 are received by the frame reception unit 32 during the analysis of the inspection frame in the inspection frame analysis unit 38, and the value of the reception counter 34 is incremented correspondingly to the reception.

The inspection frame analysis unit 38 extracts the sequence number, the transmission counter value, and other parameters from the inspection frame, and outputs these data items and the process ID to the transmission/reception counter management unit 36. In addition, the inspection frame analysis unit 38 also extracts the correction sequence number and the difference value of the transmission counter value from the inspection frame and outputs these data items and the process ID to the transmission/reception counter management unit 36. The correction sequence number and the difference value are stored in, e.g., the reserved area of the CC frame in FIG. 11.

The transmission/reception counter management unit 36 associates the process ID, the sequence number, and the transmission counter value which are received from the inspection frame analysis unit 38 with the process ID and the reception counter value (e.g., C) which are received from the frame identification unit 33 by using the process ID, and registers them in the database.

In the case where the transmission/reception counter management unit 36 receives the correction sequence number and the difference value of another inspection frame from the inspection frame analysis unit 38, the transmission/reception counter management unit 36 adds the difference value to the transmission counter value with the sequence number corresponding to the correction sequence number, and stores the result of the addition as the counter value after correction with the sequence number in the memory.

With this operation, the transmission counter value of the inspection frame sent from the frame counter correction apparatus 20 can be corrected in accordance with the number of frames which have actually passed through the frame counter correction apparatus 20. Therefore, on the reception side, the frame loss can be measured with precision from the transmission counter value, the correction value, and the reception counter value of the inspection frame which has arrived.

In accordance with the first embodiment described above, even when the normal frame passes through the frame counter correction apparatus 20 during the time period until the transmission of the inspection frame, by adding the information for specifying the inspection frame as the correction target (e.g., the sequence number) and the correction value for correcting the counter value of the inspection frame to another inspection frame, and transmitting the inspection frame, the counter value stored in the inspection frame can be corrected to be a proper value based on these information items on the reception side. With this operation, the frame loss can be measured with precision from the counter value of the inspection frame and the counter value of the reception counter 34 of the opposing apparatus 31.

Next, a second embodiment will be described. In the second embodiment, a frame counter correction apparatus 41 transmits the inspection frame containing the difference value of the counter value to an opposing apparatus 42, and the opposing apparatus 42 transmits the inspection frame containing the sequence number of the received inspection frame and the difference value of the counter value in the opposing apparatus 42 to the frame counter correction apparatus 41 so that it becomes possible for both of the frame counter correction apparatus 41 and the opposing apparatus 42 to measure the frame loss.

Although the structure of the frame counter correction apparatus 41 is not shown in the drawing, the apparatus has the same inspection frame transmission function as that of the frame counter correction apparatus 20 shown in FIG. 6, and the same inspection frame reception function (the reception counter 34, the inspection frame analysis unit 38, and the like) and packet loss measurement function as those of the opposing apparatus 31 of FIG. 12. On the other hand, the opposing apparatus 42 has the same inspection frame reception function and packet loss measurement function as those of the opposing apparatus 31 of FIG. 12, and the same inspection frame transmission function (the transmission counter 25, the counter difference management unit 27, and the like) as that of the frame counter correction apparatus 20 shown in FIG. 6. Hereinbelow, the circuit blocks which are the same as those shown in FIGS. 6 and 12 will be described by retaining the same reference numerals.

Figure 16:
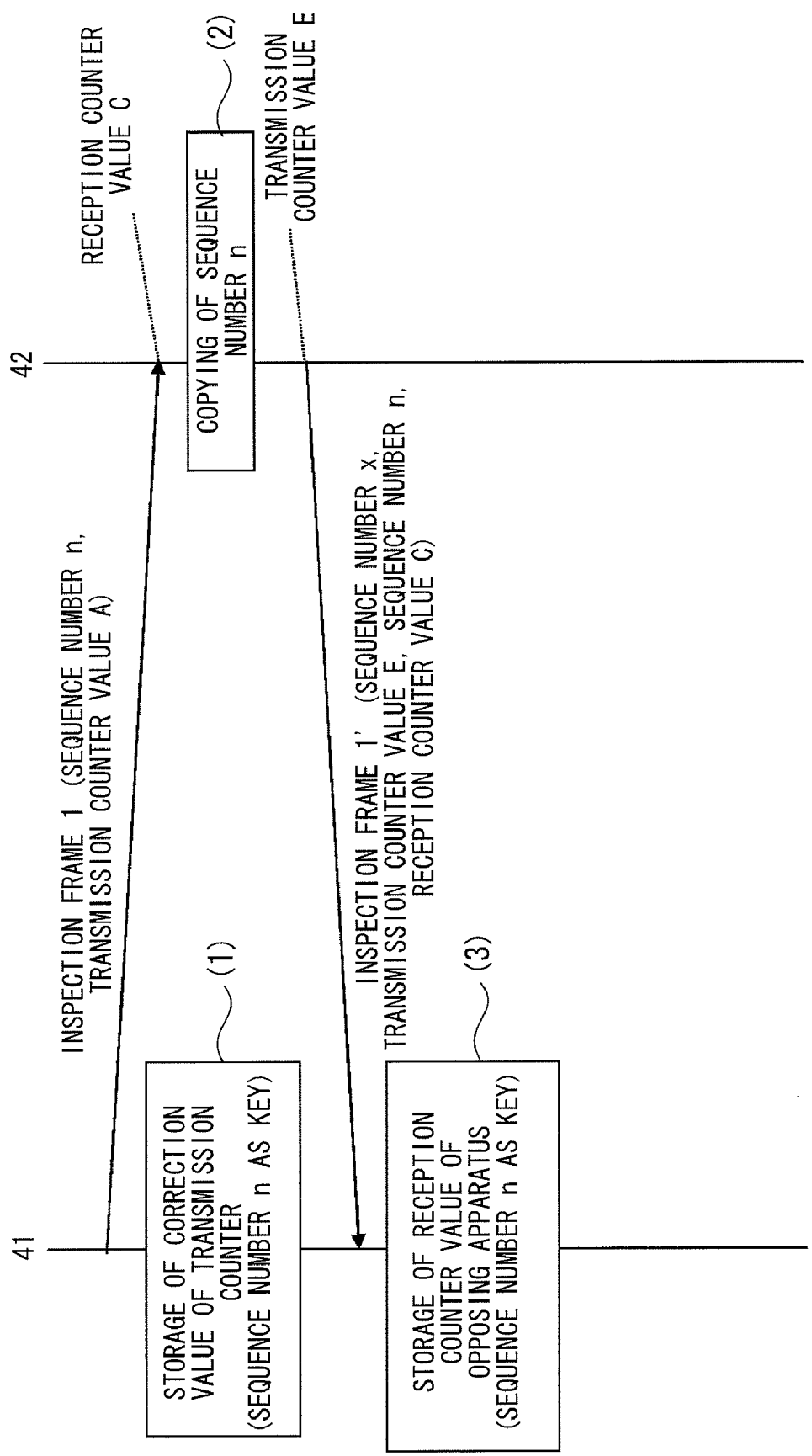
FIG. 16 is a view showing a process sequence of a frame counter correction apparatus and an opposing apparatus according to a second embodiment.

FIG. 16 is a view showing the outline of a process sequence of the frame counter correction apparatus 41 and the opposing apparatus 42 according to the second embodiment.

The frame counter correction apparatus 41 associates the sequence number n of the inspection frame with the correction value of the transmission counter or the like and stores them in a storage device (FIG. 16, (1)).

On reception of the inspection frame, the opposing apparatus 42 copies the sequence number of the inspection frame to an unused area of another inspection frame, adds the reception counter value (e.g., C) and the transmission counter value (e.g., E) of the opposing apparatus, and the correction value as necessary to the inspection frame, and transmits the inspection frame to the frame counter correction apparatus 41 (FIG. 16, (2)).

The frame counter correction apparatus 41 extracts, from the inspection frame which is received from the opposing apparatus 42, the sequence number, the reception counter value, the transmission counter value, the correction value, and the like, associates these data items with each other, and stores them in the storage device (FIG. 16, (3)). The frame counter correction apparatus 41 measures the frame loss based on these data items.

Figure 17:
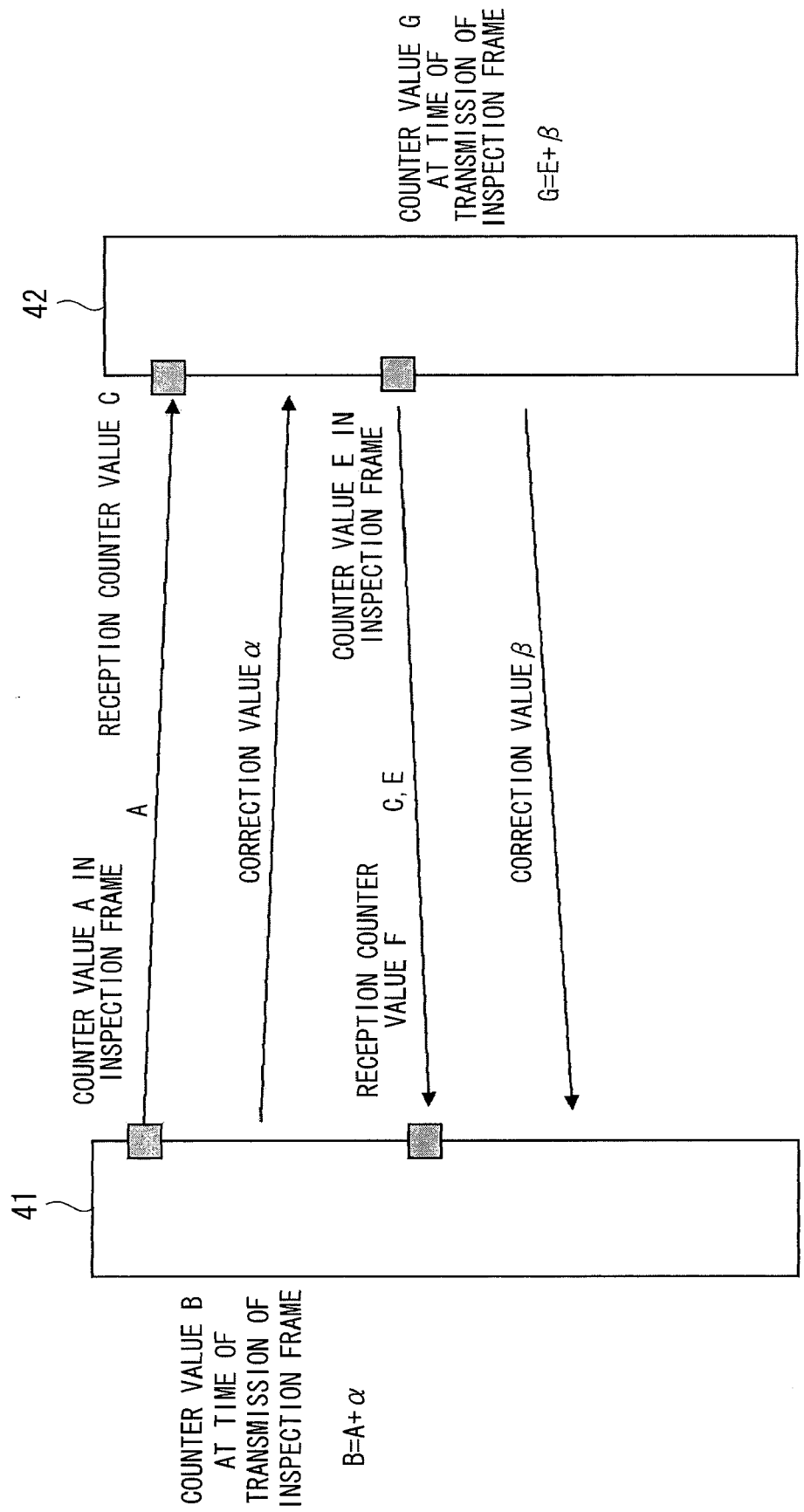
FIG. 17 is a view showing a transfer sequence of a correction value.

FIG. 17 is a view showing the transfer sequence of the correction value between the frame counter correction apparatus 41 and the opposing apparatus 42.

The frame counter correction apparatus 41 inserts the value of the transmission counter 25 (e.g., A) into the inspection frame and transmits the inspection frame to the opposing apparatus 42. In addition, when there is the difference between the counter value A inserted in the inspection frame and the value of the transmission counter 25 (e.g., B) at the time of transmission of the inspection frame, the frame counter correction apparatus 41 inserts the difference as the correction value α into the next inspection frame.

The opposing apparatus 42 acquires the value of the reception counter (e.g., C) at the time of reception of the inspection frame and stores the value in the storage device. In addition, the opposing apparatus 42 reads the counter value of the transmission counter (e.g., E) at the time of generation of the inspection frame, and transmits the inspection frame containing the counter value E and the reception counter value C to the frame counter correction apparatus 41. Furthermore, the opposing apparatus 42 acquires the counter value of the transmission counter (e.g., G) at the time of transmission of the inspection frame, calculates the difference between the counter value E and the counter value G, and determines the difference therebetween as the correction value β. The relationship among the transmission counter values E and G, and the correction value β can be represented by $G=E+\beta$. Subsequently, the opposing apparatus 42 transmits the inspection frame containing the correction sequence number for specifying the inspection frame as the correction target and the correction value β to the frame counter correction apparatus 41. With this operation, it becomes possible for the frame counter correction apparatus 41 on the reception side to correct the counter value of the received inspection frame to be a proper value and measure the frame loss with precision.

Next, a description will be given to the operation of the frame counter correction apparatus 41 on the transmission side having the structure described above with reference to a flow chart of FIG. 18 and a structural view of the database in each of FIGS. 19A-C and 20A-C. The description will be given hereinbelow on the assumption that the frame counter correction apparatus 41 has the inspection frame generation unit 22, the frame identification unit 24, the counter difference management unit 27, and the like of FIG. 6.

On reception of a transmission trigger signal of the inspection frame (FIG. 18, S41), the inspection frame generation unit 22 (see FIG. 6, the same applies to other components of FIG. 6 described below) reads the value of the transmission counter 25 (S42). Then, the inspection frame generation unit 22 generates the inspection frame and adds the sequence number and the read counter value to the inspection frame (S43).

Next, the sequence number and the counter value described above are registered in a database 51 (see FIG. 19A) in which the sequence number is associated with the transmission counter value (S44).

FIGS. 19A, 19B, and 19C show examples of the structures of the databases of the frame counter correction apparatus 41.

The database 51 shown in FIG. 19A has a data structure in which the sequence number is associated with the counter value of the inspection frame (the value of the transmission counter 25 at the time of generation of the inspection frame).

A database 52 shown in FIG. 19B has a data structure in which the sequence number, the counter value at the time of identification (time of transmission) of the inspection frame, and the correction value are associated with one another. The correction value is calculated from the difference between the value of the transmission counter 25 at the time of generation of the inspection frame and the value of the transmission counter 25 at the time of identification of the inspection frame.

A correction value table 53 shown in FIG. 19C is obtained by extracting data containing the correction value from the database 52, and has a data structure in which the sequence number is associated with the correction value. The correction entry 53 is generated on a memory.

Turning back to FIG. 18, the correction value table 53 in which the sequence number and the correction value are associated with each other shown in FIG. 19C is searched using the sequence number as the key (S45). Then, it is determined whether or not the correction value is entered at the corresponding sequence number in the correction value table 53 (S46).

When the correction value is not entered (S46, NO), the process flow moves to a step S48 where the inspection frame is generated. When the correction value is entered (S46, YES), the process flow moves to a step S47 where the correction value at the corresponding sequence number in the database 43 is acquired. Thereafter, the process flow moves to a step S48 where the inspection frame is generated.

When the generation of the inspection frame is completed and the instruction for the transmission of the inspection frame is performed, the value of the transmission counter 25 (e.g., B) at the time of identification (time of transmission) of the inspection frame is read (S49). Thereafter, the inspection frame is transmitted (S50).

After the inspection frame is transmitted, the process flow moves to a step S51 where the data is registered in the database 52 (see FIG. 19B) in which the sequence number, the counter value at the time of transmission, and the correction value (in the case where there is the correction value) are associated with one another.

Subsequently, when the inspection frame is received from the opposing apparatus 42 (S52), the corresponding data is registered in a database 61 (see FIG. 20A) in which the sequence number copied from the received inspection frame, the counter value at the time of transmission of the inspection frame, and the reception counter value of the opposing apparatus 42 are associated with one another (S53).

FIGS. 20A, 20B, and 20C are views showing examples of the structures of the databases of the frame counter correction apparatus 41. These databases are generated based on data of the inspection frame transmitted from the opposing apparatus 42 (hereinbelow referred to as a response inspection frame) and data acquired in the frame counter correction apparatus 41.

The database 61 shown in FIG. 20A has a data structure in which the sequence number, the counter value at the time of transmission of the inspection frame, and the reception counter value of the opposing apparatus 42 are associated with one another. In the database 61, the value of the transmission counter 25 (e.g., B1) at the time of transmission of the inspection frame and the counter value of the reception counter 34 (e.g., C1) of the opposing apparatus 42 which is contained in the response inspection frame transmitted from the opposing apparatus 42 are registered in association with the sequence number.

A correction value table 62 shown in FIG. 20B has a data structure in which the sequence number, the reception counter value of the opposing apparatus 42, the transmission counter value added to the inspection frame, and the correction value of the frame counter correction apparatus 41 are associated with one another. The correction value table 62 is generated on the memory.

A frame loss database 63 shown in FIG. 20C has a data structure in which the sequence number, the transmission counter value contained in the response inspection frame, the value of the reception counter 34 also contained in the response inspection frame, the value of the reception counter of the frame counter correction apparatus 41, and the counter value after correction of the opposing apparatus 42 are associated with one another. The frame loss database 63 is used for calculating the loss of frame transmitted from the opposing apparatus 42 to the frame counter correction apparatus 41.

The opposing apparatus 42 has a function of copying the sequence number of the inspection frame transmitted from the frame counter correction apparatus 41, and transmitting the response inspection frame containing the value of the reception counter 34 of the opposing apparatus, the value of the transmission counter at the time of transmission of the response inspection frame, and the correction value which is the difference value therebetween.

In the frame loss database 63 described above, in association with, e.g., the sequence number "1", the counter value B1 at the time of transmission of the inspection frame, the reception counter value C1 of the opposing apparatus 42, the reception counter value F1 of the frame counter correction apparatus 41, and the transmission counter value after correction E1 of the opposing apparatus 42 are registered.

Figure 18:
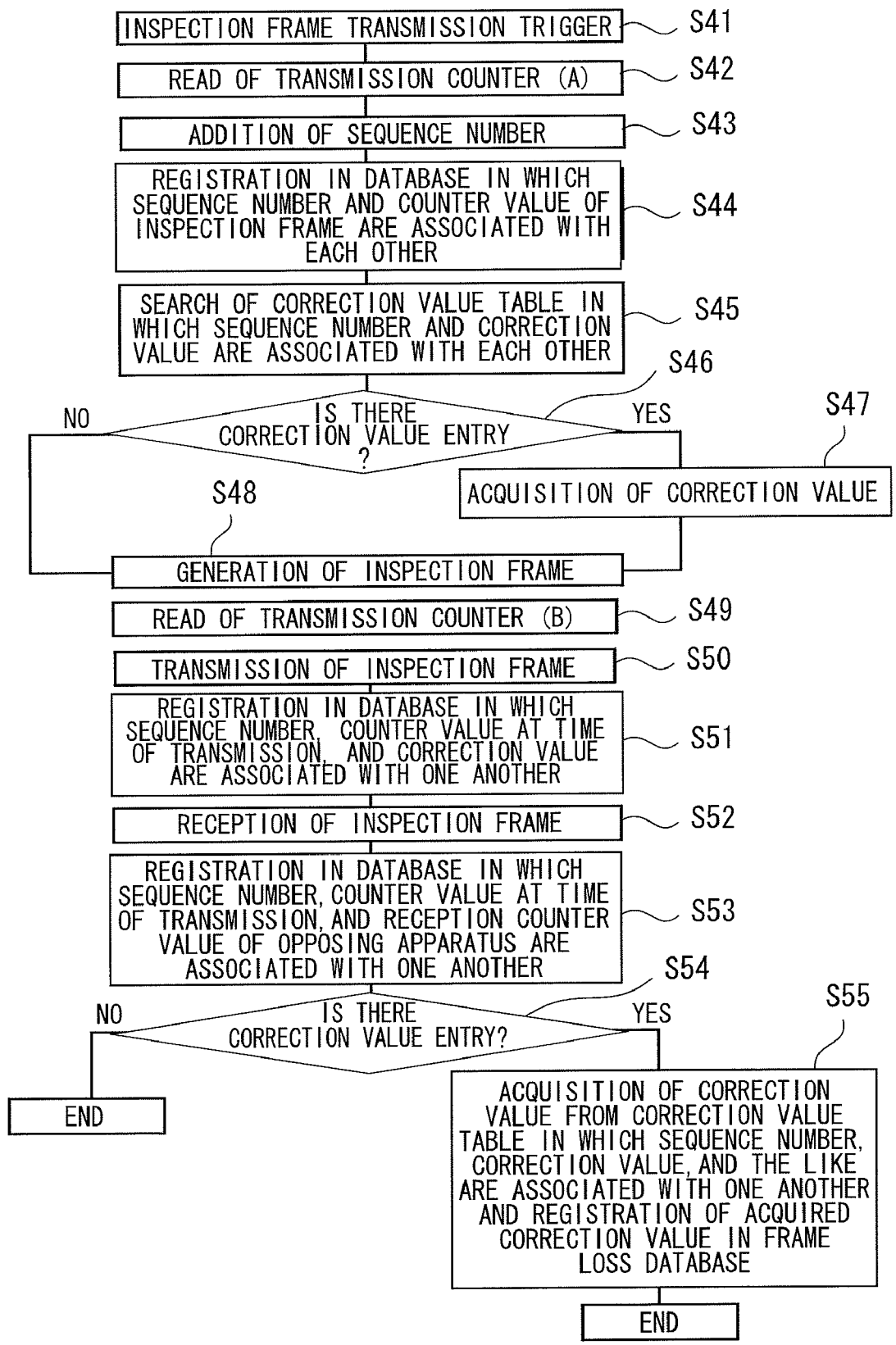
FIG. 18 is a flow chart of the frame counter correction apparatus on a transmission side.

Turning back to a step S54 of FIG. 18, it is determined whether or not the correction value corresponding to the sequence number of the received inspection frame is entered in the correction value table 62. When the correction value is entered (S54, YES), the process flow moves to a step S55 where the correction value is acquired from the correction value table 62 (see FIG. 20B) in which the sequence number is associated with the correction value, and the counter value corrected by the acquired correction value is registered in the frame loss database 63.

As a result, since the reception counter values (F1, F2 . . . ) of the frame counter correction apparatus 41 and the counter values after correction (E1, E2, E3+β3 . . . ) of the opposing apparatus 42 which are associated with the sequence numbers are registered in the frame loss database 63, the frame counter correction apparatus 41 can measure the frame loss with precision from these data items.

When it is assumed that the values of the reception counter of the frame counter correction apparatus 41 are Fn and Fn+1, and the values of the transmission counter after correction of the inspection frame of the opposing apparatus 42 are En+βn and En+1+βn+1 at the time of reception of the inspection frames having the sequence numbers n and n+1, the frame loss in the case where there is the correction value can be calculated using the values in the frame database 63 by the following expression:

$$\text{frame loss} = (Fn+1-Fn) - \{(En+1+\beta n+1) - (En+\beta n)\}.$$

Next, FIG. 21 is a flow chart of the opposing apparatus 42 on the reception side. The opposing apparatus 42 has the frame reception unit 32, the frame identification unit 33, the reception counter 34, the inspection frame analysis unit 38, and the like which are shown in FIG. 12.

On reception of the frame (FIG. 21, S61), the frame identification unit 33 determines whether or not the received frame is the inspection frame (S62).

When the received frame is not the inspection frame (S62, NO), the process flow moves to a step S63 where the reception counter 34 is incremented.

When the received frame is the inspection frame (S62, YES), the process flow moves to a step S64 where the value of the reception counter 34 at that time is read. Then, the read counter value is registered in a reception counter table 71 (see FIG. 22A) in which the process ID is associated with the reception counter value (S65).

FIGS. 22A, 22B, and 22C show examples of the structures of the databases of the opposing apparatus 42. The reception counter table 71 shown in FIG. 22A has a data structure in which the process ID and the value of the reception counter 34 are associated with each other, and is generated on a memory.

An inspection frame analysis data table 72 shown in FIG. 22B has a data structure in which the process ID, the sequence number, and the transmission counter value, the correction sequence number, and the correction value which are contained in the inspection frame are associated with one another, and is generated on the memory.

In the inspection frame analysis data table 72, in association with, e.g., the process ID sxx2, the sequence number 2, the transmission counter value A2, the correction sequence number 1, and the correction value α2 are registered. The opposing apparatus 42 can recognize that the correction value of the inspection frame having the sequence number 1 is stored in the inspection frame having the sequence number 2 from these data items.

A frame loss database 73 shown in FIG. 22C has a data structure in which the sequence number, the reception counter value of the opposing apparatus 42, and the counter value after correction of the frame counter correction apparatus 41 are associated with one another. The frame loss database 73 is used for measuring the loss of the frame transmitted from the frame counter correction apparatus 41 to the opposing apparatus 42. In the frame loss database 73, in association with, e.g., the sequence number 1, the reception counter value C1 and the transmission counter value after correction A1+α2 are registered.

Turning back to FIG. 21, information of the received inspection frame is extracted (S66), and the inspection frame analysis data table 72 (see FIG. 22B) including the process ID, the sequence number, the correction sequence number, and the like is loaded into the memory (S67).

Next, these data items are associated with one another using the process ID, and the counter value after correction is registered in the frame loss database 73 (see FIG. 22C) (S68). With the process in the step S68, in association with the sequence numbers, the reception counter values (C1, C2, C3 . . . ) of the opposing apparatus 42 and the counter values after correction (A1+α2, A2+α3, A3 . . . ) of the frame counter correction apparatus 41 are registered in the frame loss database 73.

Next, the frame loss is calculated by referring to the frame loss database 73 (S69). With the process in the step S69, from, e.g., the transmission counter value A1 and the reception counter value C1 of the opposing apparatus 42 of the inspection frame having the sequence number 1, the transmission counter value A2 and the reception counter value C2 contained in the inspection frame having the sequence number 2, and the counter value after correction A1+α2 each of which is registered in the frame loss database 73, the frame loss can be measured with precision.

When it is assumed that the values of the reception counter of the opposing apparatus 42 are Cn and Cn+1, and the transmission counter values after correction of the frame counter correction apparatus 41 are An+αn+1 and An+1+αn+2 at the time of reception of the inspection frames having the sequence numbers n and n+1, the frame loss in the case where there is the correction value can be calculated by the following expression:

frame loss=(Cn+1−Cn)−{(An+1+αn+2)−(An+αn+1)}.

In accordance with the second embodiment described above, in addition to the effect of the first embodiment, it is possible to measure the frame loss in the direction from the opposing apparatus 42 to the frame counter correction apparatus 41 with precision based on the counter values contained in the inspection frame transmitted to the frame counter correction apparatus 41 and its correction value.

Next, a description will be given to a frame counter correction apparatus according to a third embodiment of the present invention. The structure of the frame counter correction apparatus of the third embodiment is basically the same structure shown in FIG. 6.

The third embodiment is characterized in that the transmission counter 25 is instructed to lock the reading operation when the frame identification unit 24 completes the reading of the value of the transmission counter 25 after the generation of the inspection frame, and the reading operation is unlocked at the time of completion of the transmission of the inspection frame.

FIG. 23 is a view showing a process sequence of the frame counter correction apparatus according to the third embodiment. Hereinbelow, the description of the sequence which is the same as the process sequence of FIG. 8 will be omitted.

In FIG. 23, when the generation of the inspection frame is completed and the frame identification unit 24 has read the value of the transmission counter 25, the transmission counter 25 locks the reading operation for the counter value. With this operation, it is possible to prevent the value of the transmission counter 25 to be incremented by receiving the normal frame during the time period from the reading of the value of the transmission counter 25 to the transmission of the inspection frame.

On reception of a transmission completion trigger signal for notifying the completion of the transmission of the inspection frame from the frame transmission unit 26, the frame identification unit 24 instructs the transmission counter 25 to unlock the reading operation.

In accordance with the third embodiment, in addition to the effect of the first embodiment, even when the normal frame is received during the short time period from the completion of generation of the inspection frame to the actual transmission of the inspection frame, since the reading operation for the transmission counter 25 is locked and the normal frame is not transmitted during the time period, it is possible to prevent the occurrence of an error in the measurement of the frame loss on the reception side.

The present invention is not limited to the embodiments described above, and may be constituted in a manner as follows. (1) A database in which the sequence number, the counter value, and the like of the inspection frame are registered is not limited to the databases of the structures described in the embodiments, and may be any database as long as the database has a data structure which allows the correction of the counter value contained in the inspection frame.

In accordance with the frame counter correction apparatuses described above in the first to third embodiments, the counter value of the inspection frame can be corrected to be a proper value. This allows the measurement of the frame loss with precision on the reception side.

What is claimed is:

1. A frame counter correction apparatus coupled to an Ethernet network, comprising:
 a transmission counter to count a frame to be transmitted;
 an inspection frame generator to generate an inspection frame for measuring a frame loss and acquire a first count value of the transmission counter at a time of generation of the inspection frame;

a transmission counter calculator to calculate a difference between the first count value of the transmission counter at the time of generation of the inspection frame and a second count value of the transmission counter at a time of transmission of the inspection frame; and a transmission counter corrector to give the difference, which is a third count value of zero or more transmission frames other than the inspection frame, and information for specifying the inspection frame as a correction target to another inspection frame to be generated for transmitting to another frame counter correction apparatus.

2. The frame counter correction apparatus of claim 1, wherein the inspection frame generator inserts a sequence number of the inspection frame as the correction target and the difference into a reserved area of a CC frame defined by Y. 1731.

3. The frame counter correction apparatus of claim 1, wherein the transmission counter locks a reading operation for the first count value at a time of completion of identification of the inspection frame, and unlocks the reading operation at a time of completion of the transmission of the inspection frame.

4. The frame counter correction apparatus of claim 1, further comprising:
   a frame receiver;
   a reception counter to count a received frame;
   an information receiver to acquire the information for specifying the inspection frame as the correction target and the difference of the third count value of the inspection frame as the correction target which are given to another inspection frame and transmitted therewith; and
   a frame loss calculator to specify a corresponding inspection frame based on the information for specifying the inspection frame as the correction target which is acquired by the information receiver, correcting the third count value of the specified inspection frame based on the corrected count value and the count value of the reception counter.

5. An opposing apparatus arranged to receive a frame transmitted from the frame counter correction apparatus of claim 1 coupled to an Ethernet network, comprising:
   a frame receiver;
   a reception counter to count a frame received by the frame receiver;
   an information receiver to acquire a count value of the reception counter at a time of reception of an inspection frame, and information for specifying the inspection frame as a correction target and a difference between the first count value of a transmission counter on a transmission side at a time of generation of the inspection frame as the correction target and the second count value at a time of transmission of the inspection frame as the correction target which are given to another inspection frame and transmitted therewith; and
   a frame loss calculator to specify a corresponding inspection frame based on the information for specifying the inspection frame as the correction target which is acquired by the information receiver, correcting the third count value of the specified inspection frame based on the corrected count value and the count value of the reception counter.

6. The opposing apparatus of claim 5, further comprising:
   a transmission counter to count a frame at a time of transmission;
   an inspection frame generator to generate the inspection frame to which a sequence number of the received inspection frame is given; and
   a transmission counter corrector to calculate a difference between the first count value of the transmission counter at the time of generation of the inspection frame and the second count value of the transmission counter at the time of transmission of the inspection frame, wherein
   the transmission counter corrector outputs the difference and information for specifying the inspection frame as a correction target to the inspection frame generator, and
   the inspection frame generator gives the difference and the information to another inspection frame for correcting the second count value of the transmission counter at a time of transmission of the specified inspection frame, and causes the another inspection frame to be transmitted.

7. A frame counter correction method for an apparatus coupled to an Ethernet network, comprising:
   counting a transmission frame using a transmission counter;
   generating an inspection frame for measuring a frame loss, and acquiring a first count value from the transmission counter at a time of generation of the inspection frame;
   calculating a difference between the first count value of the transmission counter at the time of generation of the inspection frame and a second count value of the transmission counter at a time of transmission of the inspection frame;
   giving the difference and information for specifying the inspection frame as a correction target to another inspection frame; and
   transmitting the another inspection frame for correcting a third count value of the transmission counter a time of transmission of the specified inspection frame to another frame counter correction apparatus.

* * * * *